(12) United States Patent
Ben-Noon et al.

(10) Patent No.: US 12,413,624 B2
(45) Date of Patent: Sep. 9, 2025

(54) CYBER SECURE COMMUNICATIONS SYSTEM

(71) Applicant: Palo Alto Networks, Inc., Santa Clara, CA (US)

(72) Inventors: Ofer Ben-Noon, Tel Aviv (IL); Ohad Bobrov, Tel Aviv (IL); Gilad Roth, Modi+30 in Makabim-Re+30 ut (IL); Guy Harpak, Ramat Gan (IL); Ido Salomon, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 177 days.

(21) Appl. No.: 17/726,579

(22) Filed: Apr. 22, 2022

(65) Prior Publication Data

US 2022/0366050 A1    Nov. 17, 2022

Related U.S. Application Data

(60) Provisional application No. 63/177,998, filed on Apr. 22, 2021.

(51) Int. Cl.
*H04L 9/40*  (2022.01)
*G06F 16/955*  (2019.01)
(Continued)

(52) U.S. Cl.
CPC ............ *H04L 63/20* (2013.01); *G06F 16/955* (2019.01); *G06F 21/44* (2013.01); *G06F 21/53* (2013.01);
(Continued)

(58) Field of Classification Search
CPC ........ G06F 21/57; G06F 16/955; G06F 21/44; G06F 21/53; H04L 41/16; H04L 63/0428;
(Continued)

(56) References Cited

U.S. PATENT DOCUMENTS 7,698,398 B1    4/2010 Lai
8,069,435 B1    11/2011 Lai
(Continued)

FOREIGN PATENT DOCUMENTS

JP    2016526201 A    9/2016
KR    102038842    10/2019
(Continued)

OTHER PUBLICATIONS

"Azure AD Conditional Access Documention", Microsoft Docs, (downloaded May 25, 2022) https://docs.microsoft.com/en-us/azure/active-directory/conditional-access/.
(Continued)

*Primary Examiner* — Shaqueal D Wade-Wright
(74) *Attorney, Agent, or Firm* — Gilliam IP PLLC

(57) ABSTRACT

A communications system for providing secure access to a digital resource of a group of digital resources accessible via the internet, the system comprising: a data processing hub accessible via an IP (internet protocol) address; and a plurality of user equipment (UEs) useable to communicate via the internet, each configured to have a cyber secure isolated environment (CISE) isolated from ambient software in the UE, and comprising a secure web browser (SWB); wherein the hub and CISE are configured so that digital resources in motion and at rest in CISE are visible to the hub.

20 Claims, 15 Drawing Sheets

(51) Int. Cl.
  *G06F 21/44* (2013.01)
  *G06F 21/53* (2013.01)
  *G06F 21/57* (2013.01)
  *H04L 41/16* (2022.01)
  *H04L 67/125* (2022.01)
  *H04L 67/55* (2022.01)
  *H04W 12/08* (2021.01)

(52) U.S. Cl.
  CPC .............. *G06F 21/57* (2013.01); *H04L 41/16* (2013.01); *H04L 63/0428* (2013.01); *H04L 63/08* (2013.01); *H04L 63/083* (2013.01); *H04L 63/10* (2013.01); *H04L 63/102* (2013.01); *H04L 63/1416* (2013.01); *H04L 63/1425* (2013.01); *H04L 63/1433* (2013.01); *H04L 67/125* (2013.01); *H04L 67/55* (2022.05); *H04W 12/08* (2013.01)

(58) Field of Classification Search
  CPC ....... H04L 63/08; H04L 63/083; H04L 63/10; H04L 63/102; H04L 63/1416; H04L 63/1425; H04L 63/1433; H04L 63/20; H04L 67/125; H04L 67/55; H04W 12/08; H04W 12/06
  See application file for complete search history.

(56) References Cited

U.S. PATENT DOCUMENTS

| | | |
|---|---|---|
| 8,132,242 B1 | 3/2012 | Wu |
| 8,151,349 B1 | 4/2012 | Yee |
| 8,346,929 B1 | 1/2013 | Lai |
| 8,752,183 B1 | 6/2014 | Heiderich et al. |
| 9,021,254 B2 | 4/2015 | Bokarius et al. |
| 9,032,519 B1 * | 5/2015 | Maher .................... H04L 67/02 709/224 |
| 9,348,663 B1 * | 5/2016 | Boodman ........... G06F 16/9574 |
| 9,521,032 B1 | 12/2016 | Worsley |
| 9,547,769 B2 | 1/2017 | Aissi et al. |
| 9,635,041 B1 | 4/2017 | Warman et al. |
| 9,948,612 B1 * | 4/2018 | Jawahar .............. H04L 63/0272 |
| 10,356,693 B2 | 7/2019 | Reith |
| 10,599,486 B1 | 3/2020 | Borkar et al. |
| 10,798,140 B1 | 10/2020 | Mercier et al. |
| 10,848,571 B2 | 11/2020 | Fleck et al. |
| 10,855,754 B1 | 12/2020 | Mercier et al. |
| 10,908,785 B2 | 2/2021 | Borkar et al. |
| 10,963,532 B2 | 3/2021 | Borkar et al. |
| 11,019,066 B2 | 5/2021 | Borkar et al. |
| 11,061,999 B2 | 7/2021 | Borkar et al. |
| 11,075,984 B1 | 7/2021 | Mercier et al. |
| 11,087,008 B2 | 8/2021 | Borkar et al. |
| 11,093,570 B2 | 8/2021 | Chauhan |
| 11,153,285 B2 | 10/2021 | Chauhan et al. |
| 11,153,306 B2 | 10/2021 | Chauhan |
| 11,159,552 B2 | 10/2021 | Fleck et al. |
| 11,233,832 B2 | 1/2022 | Chauhan et al. |
| 11,265,337 B2 | 3/2022 | Smelov et al. |
| 11,275,811 B2 | 3/2022 | Borkar et al. |
| 11,323,327 B1 | 5/2022 | Chitalia et al. |
| 11,328,077 B2 | 5/2022 | Fleck et al. |
| 11,381,610 B2 | 7/2022 | Le Strat et al. |
| 11,412,003 B1 | 8/2022 | Lyon et al. |
| 11,429,243 B2 | 8/2022 | Fleck et al. |
| 11,450,069 B2 | 9/2022 | Chauhan |
| 11,469,979 B2 * | 10/2022 | Chauhan .................. H04L 1/20 |
| 11,475,146 B2 | 10/2022 | Chauhan |
| 12,026,711 B2 * | 7/2024 | LeBel ................ G06Q 30/0633 |
| 2005/0044197 A1 | 2/2005 | Lai |
| 2008/0301794 A1 | 12/2008 | Lee |
| 2009/0138804 A1 | 5/2009 | Shepherd et al. |
| 2009/0216910 A1 | 8/2009 | Duchesneau |
| 2010/0050244 A1 | 2/2010 | Tarkhanyan et al. |
| 2012/0084184 A1 | 4/2012 | Raleigh et al. |
| 2013/0297700 A1 | 11/2013 | Hayton et al. |
| 2014/0237576 A1 | 8/2014 | Zhang et al. |
| 2015/0007291 A1 | 1/2015 | Miller |
| 2015/0113092 A1 | 4/2015 | Chadha et al. |
| 2015/0201417 A1 | 7/2015 | Raleigh et al. |
| 2016/0261627 A1 | 9/2016 | Lin |
| 2017/0111322 A1 | 4/2017 | Patidar et al. |
| 2017/0187839 A1 | 6/2017 | Raleigh et al. |
| 2018/0359244 A1 | 12/2018 | Cockerill et al. |
| 2019/0065177 A1 * | 2/2019 | Khoongumjorn ......... G06F 8/71 |
| 2019/0261169 A1 * | 8/2019 | Kamal ................ H04L 63/0807 |
| 2020/0092382 A1 * | 3/2020 | Borkar .................. H04L 67/142 |
| 2020/0097614 A1 | 3/2020 | Borkar et al. |
| 2020/0177546 A1 * | 6/2020 | Petry .................... H04L 63/0209 |
| 2020/0296776 A1 | 9/2020 | Raleigh et al. |
| 2021/0176336 A1 | 6/2021 | Fleck |
| 2021/0185015 A1 | 6/2021 | Sapp et al. |
| 2022/0038282 A1 | 2/2022 | Teramoto et al. |
| 2022/0094547 A1 | 3/2022 | Duchastel et al. |
| 2022/0116345 A1 * | 4/2022 | Xu ........................ H04L 67/141 |
| 2022/0217169 A1 | 7/2022 | Varanda |
| 2022/0417277 A1 | 12/2022 | Ben-Noon et al. |
| 2023/0122247 A1 | 4/2023 | Ben-Noon et al. |
| 2023/0308451 A1 | 9/2023 | Ben-Noon et al. |

FOREIGN PATENT DOCUMENTS

| | | |
|---|---|---|
| WO | 0175564 | 10/2001 |
| WO | 2014048751 A1 | 4/2014 |
| WO | 2022224262 A1 | 10/2022 |

OTHER PUBLICATIONS

Barth A., et al., "The Security Architecture of the Chromium Browser" https://seclab.stanford.edu/websec/chromium/chromium-security-architecture.pdf.

International Preliminary Report on Patentability dated Aug. 8, 2023 for application No. PCT/IL2022/050416 filed Apr. 22, 2022.

International Search Report dated Aug. 12, 2022 for application No. PCT/IL2022/050416 filed Apr. 22, 2022.

U.S. Appl. No. 17/841,727, Non-Final Office Action mailed May 8, 2024, 20 pages.

U.S. Appl. No. 17/893,226, Non-Final Office Action mailed Jul. 3, 2024, 11 pages.

EP Application No. 22725568.4, Communication Pursuant to Article 94(3) EPC mailed May 9, 2025, 6 pages.

JP Application No. 2023565437, Office Action mailed May 20, 2025, 21 pages, including English translation.

U.S. Appl. No. 18/127,681, Non-Final Office action mailed Feb. 12, 2025, 30 pages.

* cited by examiner

290

CYBER SECURE COMMUNICATIONS SYSTEM

RELATED APPLICATIONS

The present application claims the benefit under 35 U.S.C. 119(e) of U.S. Provisional Application 63/177,998 filed on Apr. 22, 2021, the disclosure of which is incorporated herein by reference.

FIELD

Embodiments of the disclosure relate to providing cyber-secure access channels and workspaces for communications networks and digital resources. BACKGROUND The various computer and communications technologies that provide modern communications networks and the internet, encompass a large variety of virtual and bare metal network elements (NEs) that support operation of the communications networks and the stationary and/or mobile user equipment (UE) that provide access to the networks. The technologies have enabled the information technology (IT) and the operations technology (OT) that are the bedrocks of today's society and provide a plethora of methods, devices, infrastructures, and protocols for controlling industrial equipment, supporting business operations, and generating and propagating data, voice, and video content via the internet. Information of all types is readily available through the internet to most of the global population, independent of physical location. And today large segments of the global community regularly work remotely from their homes, coffee shops, and vacation venues via connectivity to their employers and work groups using their personal, Bring Your Own Device (BYOD), UEs—such as their personal smartphones, laptops, tablets, and home desktops. The networks have democratized the consumption of information and accelerated changes in societal infrastructure.

However, the benefits provided by the computer and communications technologies are not without their costs. The same technologies and benefits have substantially increased the difficulty in providing and maintaining legitimate personal and collective rights to confidentiality, and in protecting the integrity and safety of the selfsame industrial and business operations that the technologies have enabled against violation and damage from cyberattacks.

For example, a fingerprint of cyberattack surfaces characterizes each UE, whether it is a personal, spatially untethered BYOD or an enterprise, workplace user equipment (WPUE) and provides vulnerabilities for exploitation by malicious hackers to wreak havoc possibly on the UE and more often on entities and systems to which the UE connects. Each UE, and in particular a BYOD, in addition to functioning as a person's communications node, is a potential cyberattack node for any communications network to which the UE connects. For enterprises that must be in contact with clients, workers, and/or associates that have segued at least in part to remote work using their personal BYODs, vulnerability to cyberattack is amplified by a number of their remote contacts, the software configurations in the contacts' respective BYODs, and the manifold of non-enterprise communications that the contacts engage in using the UEs. The gravitation of enterprise data and storage resources to the cloud and the proliferation of technologies such as Infrastructure as a Service (IaaS), Platform as a Service (PaaS), and Software as a Service (SaaS) that remote contacts access and use further compounds the complexity of providing for appropriate cyber protection.

SUMMARY

An aspect of an embodiment of the disclosure relates to providing a cyber secure communications system, hereinafter also referred to as "CyberSafe", that provides enhanced visibility to communications traffic propagated by the system and operates to provide cyber protection for, and secure access to a digital resource of a body of resources for an authorized user of a UE—a BYOD or a WPUE—associated with the body of resources.

For convenience of presentation it is assumed that the body of digital resources is owned by an enterprise, optionally referred to as "MyCompany", that employs or engages in tasks with users authorized to use a UE associated with the body of resources to access a MyCompany resource. A UE associated with the body of resources is a UE that has been configured in accordance with an embodiment of the disclosure to enable an authorized user access a MyCompany resource. A UE associated with the body of resources may be referred to as a MyCompany UE and a user authorized to use a MyCompany UE to access a MyCompany resource may be referred to as a MyCompany user or simply user.

Digital resources include any information in digital format, at rest or in motion, and comprise by way of example electronic documents, images, files, data, databases, and/or software, which refers to executable code and/or data. Digital resources also include any software and/or hardware that may be used to operate on or generate a digital resource. A digital resource in motion is a digital resource that is being used, and/or operated on, and/or in transit between nodes of a communication system. A digital resource at rest is a digital resource that is in storage and not in motion.

In an embodiment CyberSafe comprises an, optionally cloud based, data and processing security hub, also referred to as a CyberSafe hub, and a web browser, also referred to as a CyberSafe secure web browser (SWB), resident in a CyberSafe isolated secure environment (CISE) of a MyCompany UE configured by, or in accordance with, CyberSafe. In an embodiment, the CISE operates to isolate software (code and/or data) comprised in the SWB and in other applications that may reside in CISE from software in the UE, also referred to as UE ambient software, that may be used for tasks not associated with MyCompany resources, and from software external to the UE. In an embodiment ingress and egress of data respectively into and out from CISE and between applications in CISE is monitored and controlled by the SWB, which is configured by CyberSafe to enforce CyberSafe and/or MyCompany security policies relevant to and access to and movement of data within and into and out from CISE. The isolation and control of movement of and access to data, and enforcement of policies operate to provide enhanced protection against cyber damage and security against leakage of data from and/or into MyCompany resources that may result from communication with and via a MyCompany UE.

In an embodiment monitoring ingress and egress of data comprises monitoring communications supported by SWB, storing and processing data comprised in the monitored communications and making the data available to the CyberSafe hub and to MyCompany IT. In an embodiment, monitoring is performed on communications outgoing from CISE and from SWB before the outgoing communications are encrypted by SWB and on communications incoming into CISE after the incoming communications are decrypted by SWB. In addition, user interactions with the SWB may be monitored locally or by CyberSafe security hub. As a result, communications between the UE and MyCompany and actions of a MyCompany user interfacing with the UE are substantially completely visible to CyberSafe and to MyCompany and may be processed by the SWB, the hub and/or other trusted components associated with MyCompany.

In accordance with an embodiment of the disclosure, the SWB is configured to request from the CyberSafe security hub upon launch from the MyCompany UE by a MyCompany user, permission to run from the UE and comprises software, optionally referred to as cladding, such as anti-injection and/or anti-exploitation software, that operates to protect the SWB from cyber damage. Upon receiving a request for permission, the CyberSafe hub optionally checks the ID of the UE user and vets integrity of the web browser software and the security posture of the UE. If the user ID is acceptable, the software integrity, and/or cladding, are found to be intact, and/or the security posture of the UE environment satisfactory, the security hub may permit operation of the SWB from the UE and optionally issues the SWB a security token for presentation to access a MyCompany resource.

In an embodiment the CyberSafe security hub, the CyberSafe SWB, and an Identity Provider (IDP) that operates to control access to MyCompany's digital resources are configured to cooperate in permitting an authorized user of a MyCompany UE access to a resource of MyCompany's digital resources. CyberSafe may operate to constrain MyCompany users to use the CyberSafe SWB to access MyCompany resources.

In an embodiment CyberSafe configures the SWB to acquire data characterizing websites accessed by MyCompany users of MyCompany UEs and browsing behavior of MyCompany users, and upload the data to the CyberSafe hub. The CyberSafe hub and/or the SWB processes the data to estimate risk of damage, hereinafter also referred to as cyber damage, to a MyCompany resource resulting from access to the websites and/or user browsing behavior that may expose the resource to a cyberattack. The hub and/or the SWB may configure the SWB and/or the UE responsive to the cyber damage risk estimate to moderate the risk of cyber damage. Configuring the SWB to moderate risk may comprise configuring the SWB to limit or prevent access to a website, and/or to limit a functionality of the website, the SWB, the UE and/or user browsing behavior and/or permissions to transfer data between the SWB or the CISE and other applications. Configuring the UE to moderate risk may comprise requiring a user of the UE to update passwords, patching, firewalls, website permissions, and/or disable remote access.

In an embodiment CyberSafe acquires data characterizing a browser extension and/or user browsing behavior relative to using a browser extension and processes the data to estimate a risk to cyber security of a MyCompany resource resulting from downloading the browser extension and modifying the SWB to add functionalities provided by the browser extension to the SWB. CyberSafe may allow integrating a browser extension with the SWB after configuring the SWB and/or the browser extension to moderate the risk posed by the browser extension.

In accordance with an embodiment of the disclosure CyberSafe uses CyberSafe SWB to monitor and acquire data characterizing use of MyCompany CCaaS (cloud computing as a service) resources by MyCompany users and processes the data to determine normal use patterns of the services evidenced by the users. CyberSafe may configure the CyberSafe SWB to monitor CCaaS sessions engaged in by MyCompany users to identify responsive to the normal use patterns use anomalies exhibited during the sessions. Responsive to identifying a use anomaly in a CCaaS session, the SWB may constrain use of the CCaaS resource in real time during the session. Constraining use may comprise preventing real time data transfer between the CCaaS and the user and/or canceling the session. Upon identifying an anomaly the SWB may generate an alert and upload data relevant to the anomaly to the hub for analysis. In an embodiment CyberSafe configures use of a given CCaaS resource by a MyCompany user based on the given CCaaS resource, a normal CCaaS use pattern of the resource, an authorization profile of the user and/or the particular MyCompany UE that the user uses to engage in the CCaaS session as may be mandated by CyberSafe and/or MyCompany policy, which may change dynamically based on context of usage. In accordance with an embodiment of the disclosure, CyberSafe uses CyberSafe SWB to provide Single-Sign-On (SSO) access to a CCaaS that doesn't support SSO natively by mimicking the user-and-password inputs that the CCaaS expected in order to sign into the CCaaS automatically.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. The phrase "in an embodiment", whether or not associated with a permissive, such as "may", "optionally", or "by way of example", is used to introduce for consideration an example, but not necessarily a required configuration of possible embodiments of the disclosure. Unless otherwise indicated, the word "or" in the description and claims is considered to be the inclusive "or" rather than the exclusive or, and indicates at least one of, or any combination of more than one of items it conjoins.

Figure 1:
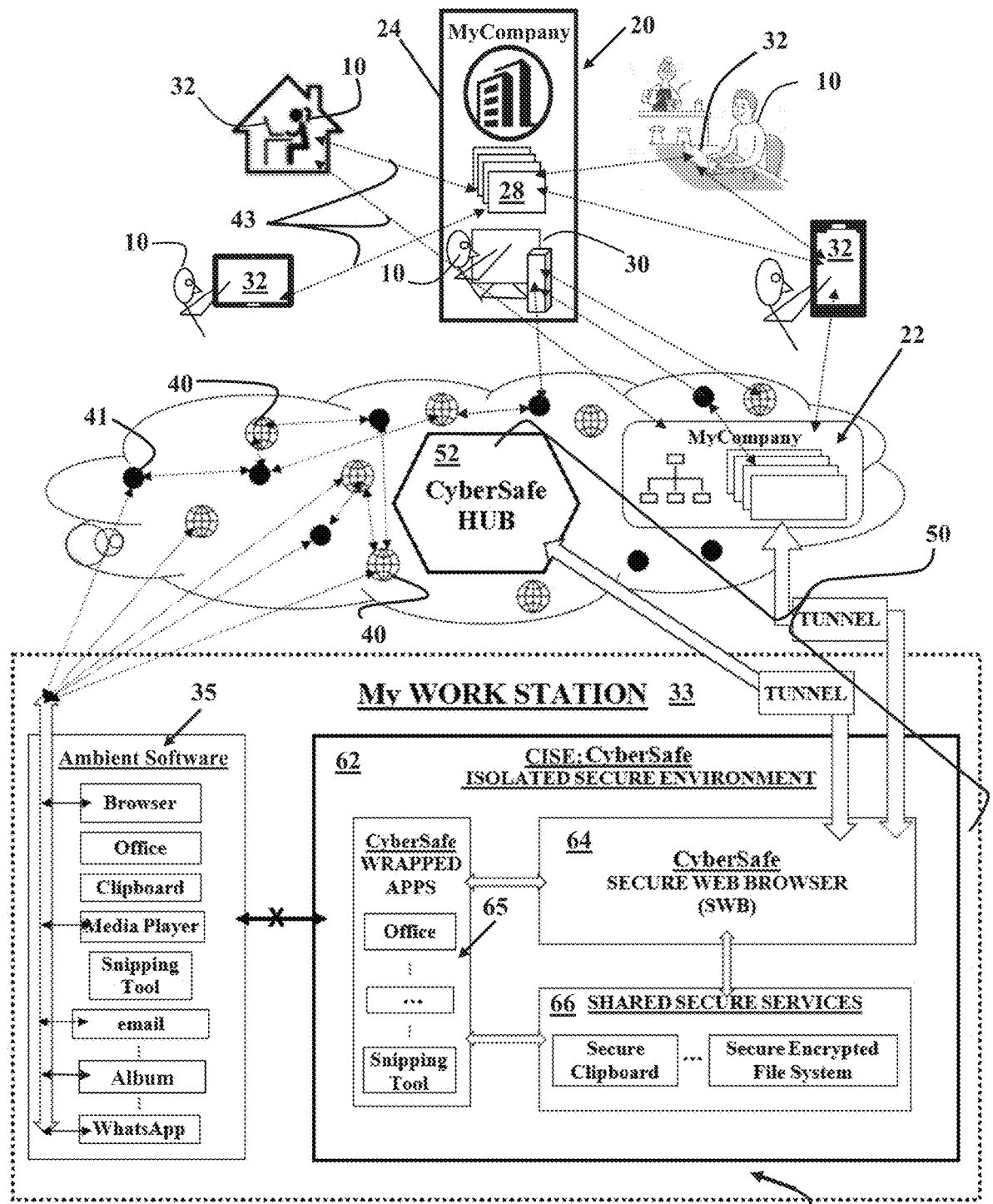
FIG. 1 schematically shows a MyCompany UE configured having a CyberSafe CISE and SWB to provide cyber security to an enterprise referred to as MyCompany, in accordance with an embodiment of the disclosure.

FIG. 1 schematically shows a CyberSafe system 50 that operates to provide cyber secure communication for a communications network of an enterprise 20, also referred to as MyCompany 20 or simply MyCompany, and for MyCompany users 10 that use the communications network, in accordance with an embodiment of the disclosure. MyCompany may have cloud based digital resources 22, premises 24 housing on-premise servers (not shown) for storing and processing MyCompany on-premise digital resources 28, and WPUEs 30 for use by MyCompany users 10 when on-premise for accessing, using, and processing the cloud based and on-premise resources to conduct MyCompany business. MyCompany may permit users 10 when off-premise to access MyCompany resources from various locations using any of various types of BYODs 32. It is assumed that MyCompany users 10 may use their respective BYODs 32 for personal activities, and that MyCompany users when on-premise may, in accordance with permissions defined by MyCompany policy, be allowed to use WPUEs 30 for personal activities. Personal activities may include web browsing, social networking, uploading, and downloading material, via the cloud infrastructure of communication nodes 41 and websites 40. The MyCompany network, may be required to support, as schematically indicated by double arrow-head dashed lines 43, communication between any of various combinations of MyCompany on-premise digital resources 28, cloud based digital resources 22, on-premise users 10 using WPUEs 30 installed in a MyCompany premises 24, and off-premise users 10 using BYODs 32 at various off-premise locations.

In accordance with an embodiment of the disclosure CyberSafe 50 comprises an optionally cloud based CyberSafe processing and data hub 52 and a software architecture 60 that operates to cyber protect MyCompany communications and digital resources in each of a plurality of MyCompany UEs, BYODs 32 and/or WPUEs 30, used by MyCompany users 10 to access and use MyCompany resources. CyberSafe hub 52 comprises and/or has access to cloud based and/or bare metal processing and memory resources required to enable and support functionalities that the hub provides to CyberSafe 50 and components of CyberSafe.

By way of example, FIG. 1 schematically shows a CyberSafe software architecture 60 that configures a MyCompany UE 33, to protect MyCompany digital resources, at rest and/or in motion, and provide cyber secure access to the resources for a user 10 that may use MyCompany UE 33. MyCompany UE 33 may be a BYOD or a WPUE and be referred to as My-WorkStation 33.

Architecture 60 comprises a CyberSafe isolated environment, CISE 62, that is isolated from ambient software 35 resident in My-WorkStation 33 and comprises a SWB 64, resident in CISE 62. Ambient software 35 may typically include data and applications that are not intended for use in conducting MyCompany business. By way of example, ambient software 35 may comprise a browser, an office suite of applications, a clipboard, an album of family images, a photo album and WhatsApp. CISE 62 may also include a set 65 of applications optionally imported from ambient software 35 and wrapped and optionally containerized by CyberSafe to associate cybersecurity features required by CyberSafe and/or MyCompany policy features with the applications. In an embodiment CISE comprises an ensemble of shared secure services 66 that may be accessed for use by SWB 64 and by applications in set 65 via SWB 64. Shared secured service 66 optionally comprise a secure clipboard and a secure encrypted File System.

CISE 62 provides an isolated security domain delimited by a substantially continuous security perimeter generated and supported by security applications, features, and functionalities of SWB 64, shared secure services 66, and wrapping of wrapped applications 65. In accordance with an embodiment, CISE 62 may be configured to provide cyber security and isolation using methods of, and compliant with, such standards as PCI DSS (Payment Card Industry Data Security Standard), HIPAA (Health Insurance Portability and Accountability Act), and/or SOC2 (American Institute of CPAs' Service Organization Control). Optionally CISE 62 is isolated from the ambient software on the network level.

In an embodiment to provide isolation and security SWB 64 is configured to monitor and control ingress and egress of data respectively into and out from CISE 62 and between applications in CyberSafe wrapped applications, shared secure services 66 and/or SWB 64. SWB 64 is advantageously configured by CyberSafe to enforce CyberSafe and/or MyCompany security policies relevant to and access to and movement of data within and into and out from CISE. The isolation and control of movement of and access to data, and enforcement of policies operate to provide enhanced protection against cyber damage and security against leakage of data from and/or into MyCompany resources that may result from communication with and via a MyCompany UE.

In an embodiment monitoring ingress and egress of data comprises monitoring communications supported by SWB 64, storing and processing data comprised in the monitored communications and making the data available to the CyberSafe hub and to MyCompany IT. In an embodiment, monitoring is performed on communications outgoing from CyberSafe isolated environment CISE 62 (FIG. 1) before the outgoing communications are encrypted by SWB 64 and on communications incoming into CISE after the incoming communications are decrypted by SWB 64. As a result, user browsing is substantially completely visible to CyberSafe and to MyCompany and can be processed locally or remotely. Monitoring may be substantially continuous, stochastic, or periodic. Stochastic monitoring comprises monitoring communications for monitoring periods of limited duration that begin at onset times that are randomly determined, optionally in accordance with a predetermined probability function. Periodic monitoring comprises continuous monitoring of communications during monitoring periods at periodic onset times. Monitored communications may be mirrored by SWB 64 to a destination in CyberSafe hub and/or MyCompany for storage and/or processing or may be filtered for data of interest before being transmitted to a destination in CyberSafe hub and/or MyCompany for storage and/or processing. Features and constraints that configure how monitored communications are handled by SWB 64 may be determined based on CyberSafe and/or MyCompany policy. Such policy may specify how processing of data is shared between the local SWB and the CyberSafe hub.

In an embodiment, SWB 64 may be an independent application comprising CyberSafe features and/or functionalities, or an existing web browser, such as Google Chrome, Microsoft Edge, Apple Safari, Mozilla Firefox, Opera, or Brave, modified and provided with additional CyberSafe features and/or functionalities by changes and/or additions to browser code and/or by integrating with CyberSafe extensions. The features and functionalities may be incorporated into the existing browser and the browser converted to a CyberSafe SWB by: interfacing with the input and output of the existing browser using operating system hooks; patching the original binary of the browser; building a dedicated extension on top of the browser's API and/or SDK; and/or dynamically modifying memory of the browser when the browser is in operation.

By way of example, the features and/or functionalities, hereinafter generically referred to as functionalities, may comprise, at least one or any combination of more than one of functionalities that enable SWB 64 to: cooperate with a MyCompany IDP to verify and authorize a user 10 to access CISE 62 and MyCompany resources; acquire data characterizing websites visited by MyCompany users that may be used to classify cyber risks associated with the websites; acquire data characterizing browser extensions that may compromise SWB 64 security features; acquire data that may be processed to determine normal behavior and use of MyCompany resources by MyCompany users as a group and/or as individuals; monitor engagement of a MyCompany user with a MyCompany resource and control the engagement to enforce CyberSafe and/or MyCompany security constraints.

In an embodiment, enforcing CyberSafe and/or MyCompany security constraints comprises requiring that all communications between UE 33 and a MyCompany resource be propagated via SWB 64 and CyberSafe tunnels that connect the SWB 64 to the resource and enforcing CyberSafe and/or MyCompany permissions to the resources. Optionally, enforcing security constraints comprises identifying anomalies in communications between UE 33 and a company resource and operating to eliminate or ameliorate damage from an identified anomaly and generate an alert to its occurrence.

Flow diagrams presented in FIGS. 2A-6B show elements of procedures performed by a CyberSafe System and an SWB, such as CyberSafe system 50 and SWB 64, that exhibit and illustrate functionalities of the CyberSafe system and of the SWB, in accordance with an embodiment. The discussion assumes that the CyberSafe system provides cyber security services to a given MyCompany enterprise having a plurality of users $U_n(1 \leq n \leq N)$ identified by respective user IDs, $U\text{-}ID_n(1 \leq n \leq N)$. The users are assumed to have access to and use user equipment identified by user equipment IDs, $UE\text{-}ID_e(1 \leq e \leq E)$ and that CyberSafe has configured the UEs with CISEs and CyberSafe browsers, SWBs, referenced by an index b respectively identified by SWB browser IDs, $B\text{-}ID_b$.

Figure 2A:
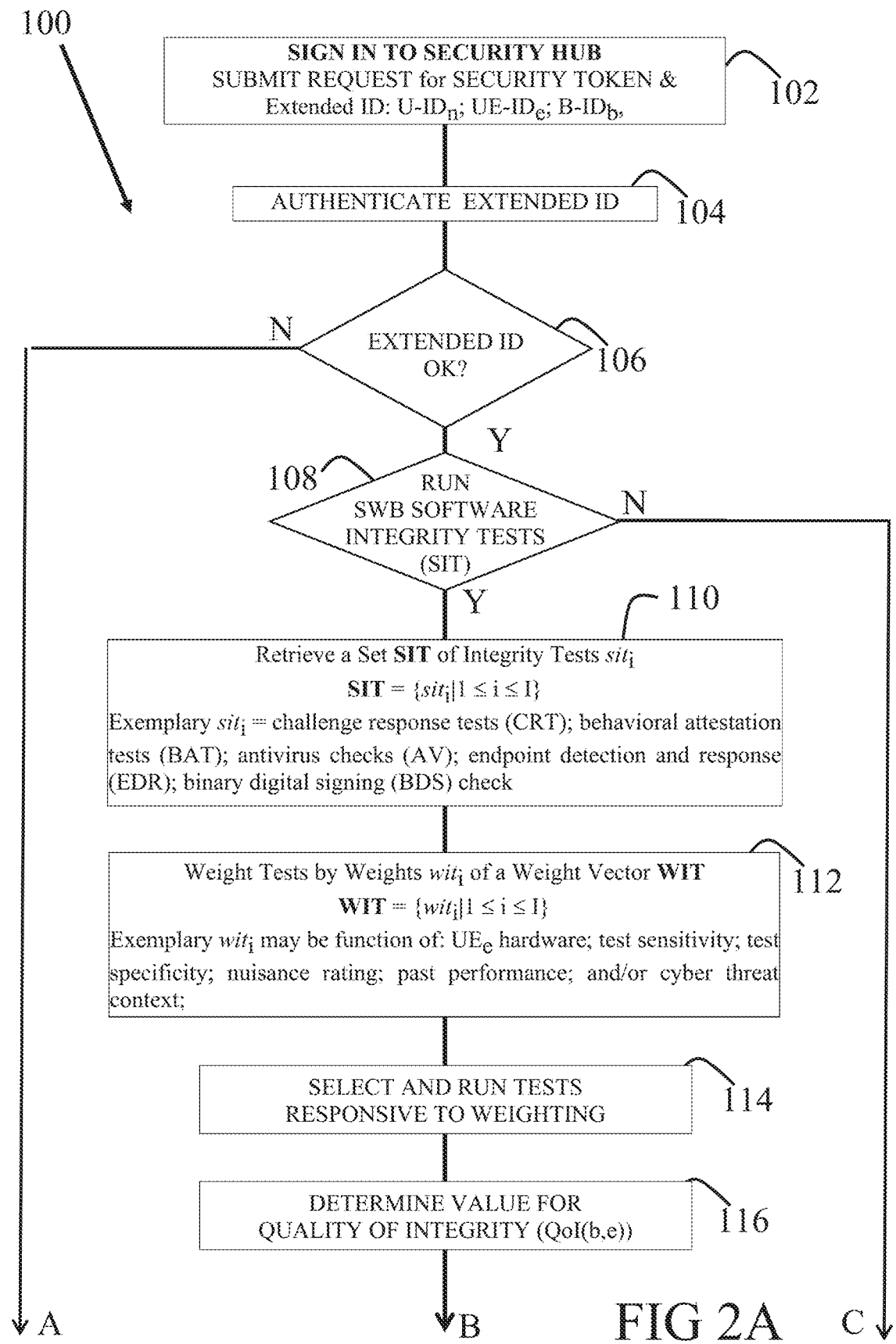
FIGS. 2A-2C show a flow diagram of a procedure by which the SWB shown in FIG. 1 may engage in a handshake with a CyberSafe hub to acquire a token for use in accessing a MyCompany resource, in accordance with an embodiment of the disclosure.
Figure 2B:
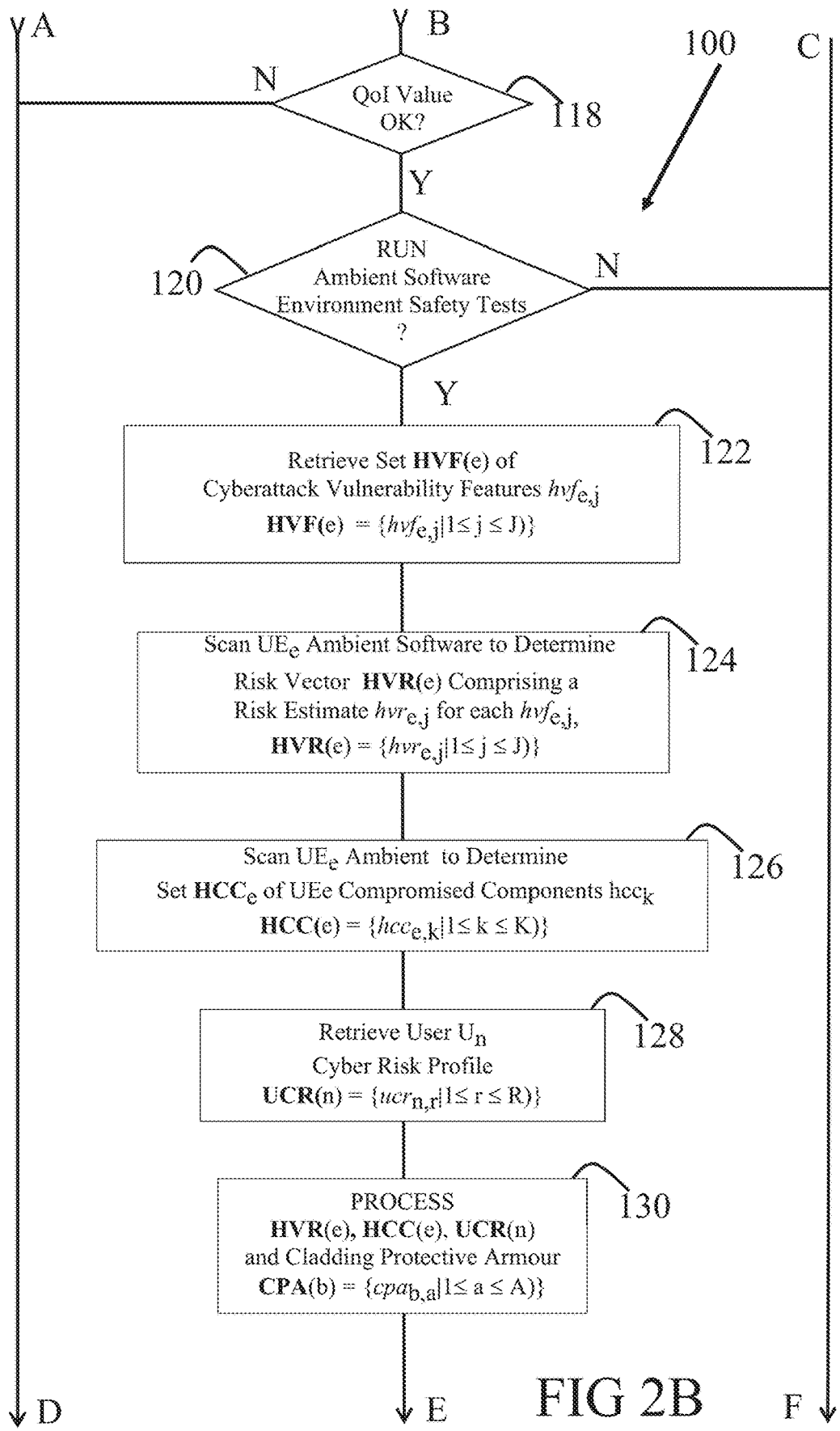
Figure 2C:
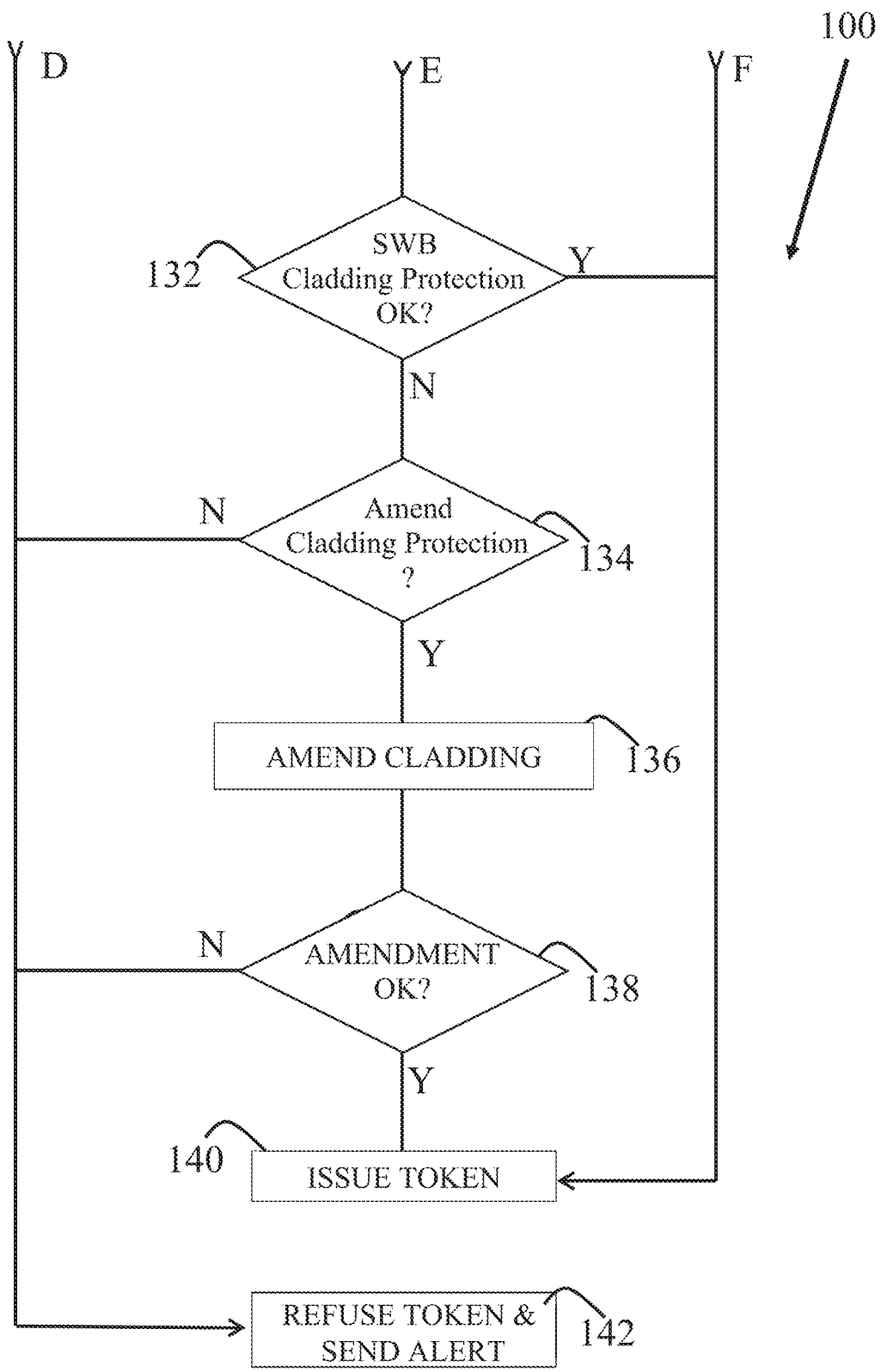

FIGS. 2A-2C show a flow diagram 100 of a procedure by which a given user $U_n$ using user equipment $UE_e$ contacts the CyberSafe security hub to request authorization to access and use CISE in $UE_e$ and have a resident $SWB_b$ in CISE issued a security token for access to MyCompany resources.

In a block 102, user $U_n$ operates $UE_e$ to sign in to the CyberSafe security hub and submit a request for a security token, the request comprising an Extended ID that includes the user ID, $U\text{-}ID_n$; the user equipment ID, $UE\text{-}ID_e$; and a $SWB_b$ ID, $B\text{-}ID_b$ that identifies the SWB installed in $UE_e$. $U\text{-}ID_n$ may include the username, a password, and/or such data that associates the user with $UE_e$, $SWB_b$, and/or MyCompany, such as a date at which the user was first registered as a MyCompany user. $UE\text{-}ID_e$ may include any suitable identifier such as a MAC (media access) address, a UUID (Universal Unique Identifier), or an IMSI (international mobile subscriber identity), and/or information that associates $UE_e$ with user $U_n$, $SWB_b$, and/or MyCompany. The $B\text{-}ID_b$ may include a browser user agent string, any suitable identifier that CyberSafe assigns $SWB_b$, and/or information that associates $SWB_b$ with $UE_e$, $U_n$, and/or MyCompany.

It is noted that a given user $U_n$ may be associated with more than one $UE_e$ and/or more than one $SWB_b$, and the user ID $U\text{-}ID_n$ may comprise data that identifies the associations. Similarly, a given user $UE_e$ may be associated with more than one $U_n$ and/or more than one $SWB_b$, and a given $SWB_b$ with more than one $U_n$ and/or more than one $UE_e$, and the respective IDs, $UE\text{-}ID_e$ and $B\text{-}ID_b$ may comprise data that maps the associations. Any combination of one or more of $U_n$, $UE_e$, and/or $SWB_b$ may comprise a Time of Day (ToD) for each of at least one previous sign in to CyberSafe.

Optionally, in a block 104 the CyberSafe Security Hub authenticates the Extended ID. Authenticating the Extended ID may comprise engaging in a three factor authentication of user $U_n$ and determining consistency of the associations and/or ToDs in at least one of $U\text{-}ID_n$, $UE\text{-}ID_e$, or $B\text{-}ID_b$ and another at least one of the IDs.

In a decision block 106 if the Extended ID is not OK, the hub proceeds to a block 142, denies the token request, and optionally sends an alert of the refusal to the CyberSafe hub. On the other hand, if the Extended ID is OK the hub optionally proceeds to a decision block 108 to decide whether or not to run an integrity test on the $SWB_b$ software. The decision to run or not to run an integrity test may depend on a MyCompany and/or CyberSafe testing policy. The policy may depend on when the CyberSafe hub ran a last integrity test on the $SWB_b$, and/or $UE_e$, a user profile characterizing user $U_n$ browsing behavior and internet use pattern, and/or a feature of a cyberattack landscape. For example, MyCompany may have a policy that a delay between integrity tests be no less than or greater than certain lower and upper bound delays. A decision may depend on whether user $U_n$ browses to cyber dangerous websites listed in a list of dangerous websites at a frequency greater than a predetermined frequency or whether the user tends to be lax in updating passwords or patching applications. A cyberattack landscape may comprise frequency and/or severity of cyberattacks that have recently been experienced by MyCompany or other enterprises and/or what types of cyberattacks have been encountered. Optionally, if the decision in decision block 108 is to skip an integrity test, the hub proceeds to a block 140 and issues the desired token. If the decision is to undertake an integrity test, the hub may proceed to a block 110 and retrieve from a database the hub comprises or to which the hub has access, a set "SIT", of at least one software integrity test, "$sit_i$", where $SIT=\{sit_i | 1 \le i \le I\}$ that may be used to determine integrity of the $SWB_b$ software. An exemplary SIT may comprise at least one, or any combination of more than one of:

$sit_1 = CRT$ (challenge response test);

$sit_2 = BAT$ (behavioral attestation test);

$sit_3 = AV$ (antivirus check);

$sit_4 = EDR$ (endpoint detection and response);

$sit_5 = BDS$ (binary digital signing);

⋮

$sit_I$

In a block 112 the CyberSafe hub determines a weight vector WIT comprising a weight $wit_i$ for each $sit_i$ that provides an estimate for how appropriate the test $sit_i$ is for determining integrity of the $SWB_b$ software. In an embodiment a $wit_i$ for a given $sit_i$ is a function of:
  $UE_e$ hardware type, for example if the $UE_e$ is a mobile device, a tablet, or desktop which may limit what types of the given $sit_i$, may be performed on the $UE_e$;
  sensitivity, the true positive rate of the given $sit_i$;
  specificity, the true negative rate of the given $sit_i$;
  nuisance rating, which provides a measure of inconvenience performance of the test causes user $U_n$;
  past performance of the test; and/or
  a current cyberattack context, which identifies current prevalence and severity of cyberattack types.

In a block 114 CyberSafe hub runs a selection of tests $sit_i$ on $SWB_b$ software responsive to their respective weights $wit_i$, for example where a greater weight $wit_i$ indicates grater relevance, by selecting integrity tests $sit_i$ for which their respective weights are greater than a median weight $wit_i$.

In a block 116 CyberSafe hub determines a value for a measure of a QoI(e,b) (quality of integrity) for $SWB_b$ software in $UE_e$ responsive to a measure of integrity returned by each of the selected tests $sit_i$. In an embodiment QoI(e,b) is an average of the measures of integrity provided by the $sit_i$ weighted by their respective weights $wit_i$. Optionally, in a decision block 118 CyberSafe hub determines if the QoI value is satisfactory or not. If the QoI is not satisfactory the hub proceeds to block 142 and denies issuing the token and optionally sends an alert. On the other hand if the QoI is satisfactory the hub proceeds to a decision block 120 to determine whether or not to run ambient software environment tests on $UE_e$.

Software environment tests are tests to determine to what extent, if at all, ambient software in $UE_e$ has been compromised by cyber damage or is insufficiently protected against cyber damage. The decision whether or not to perform the environment test on $UE_e$ may be based on many of the same considerations that are weighed when making the decision as to whether or not to perform to integrity tests. For example, the decision may depend on MyCompany and/or CyberSafe policy and such factors as $UE_e$ hardware, for example whether the $UE_e$ is a mobile phone or laptop, when a last environment test was run on $UE_e$, a browsing behavior pattern of user $U_n$, and/or a feature of a cyberattack landscape.

Optionally, if the decision in decision block 120 is to skip the software environment test, the CyberSafe hub may proceed to block 140 and issue the desired token. If on the other hand the decision is to undertake an environment test, the hub may optionally proceed to a block 110 and retrieve from a database a set "HVF(e)" of at least one cyberattack vulnerability feature $hvf_{e,j}$ to be determined as present or absent, where $HVF(e)=\{hvf_{e,j} | 1 \le j \le J\}$. HVF(e) may comprise static and/or dynamic vulnerability features. Static vulnerability features are features that are code and/or data elements comprised in the ambient software of $UE_e$ that are considered to render the ambient software and/or digital resources that are not comprised in the ambient software, such as CyberSafe and/or MyCompany resources, vulnerable to cyberattack. Dynamic vulnerability features are temporary vulnerability features, such as whether the $UE_e$ is connected to a public WiFi or to a cyber dangerous website, that characterize a current use of $UE_e$. An exemplary HVF(e) may comprise at least one, or any combination of more than one of vulnerability features whose presence or absence may be determined by response to, optionally, the following queries:

$hvf_{e,1} =$ $AV$ (anti-virus)/$EDR$ (Endpoint Detection & Response) installed?;

$hvf_{e,2} =$ firewall installed and enabled?;

$hvf_{e,3} = OS$ (operating system) patched to the latest version?;

$hvf_{e,4} =$ applications patched to latest versions?;

$hvf_{e,5} =$ access to $UE_e$ require authentication?;

$hvf_{e,6} =$ dangerous software defaults present?;

$hvf_{e,7} =$ is public Wi-Fi being used?;

$hvf_{e,8} = UE_e$ connected to a $VPN$ (virtual private network)?;

$hvf_{e,9} =$ security level of connected network?;

⋮

$hvf_{e,J}$.

Optionally, in a block 124 CyberSafe hub scans the $UE_e$ ambient software environment to detect presence of each $hvf_{e,j}$ and determine a risk vector HVR(e) comprising a cyberattack risk estimate $hvr_{e,j}$ for each $hvf_{e,j}$, where $HVR(e)=\{hvr_{e,j} | 1 \le j \le J\}$. Determining a risk estimate for a given vulnerability $hvf_{e,j}$ is generally dependent on the type of vulnerability and a cyberattack landscape. For example, determining a risk estimate for a given public Wi-Fi may be dependent on a physical location of the Wi-Fi, current traffic carried by the Wi-Fi at a time for which the estimate is made, and recent history of cyberattacks attempted via the Wi-Fi. Risks associated with patching may be a function of types of types of patching required or installed.

In a block 126 CyberSafe may scan $UE_e$ ambient software to determine a set HCC(e) of compromised components $hcc_k$ in the ambient software, where HCC(e)={$hcc_{e,k}$|1≤k≤K)}. And in a block 128 CyberSafe may retrieve from a CyberSafe database a user profile that characterizes a cyber risk profile of the user optionally comprising a set UCR(n) of risk components $ucr_{n,r}$(1≤r≤R), where UCR(n)={$ucr_{n,r}$|1≤r≤R)}, that may be used to characterize behavioral features of user $U_n$ that expose CyberSafe and/or MyCompany to cyberattack.

In a block 130 CyberSafe processes HVR(e), HCC(e), UCR(n), and/or a set CPA(b) of cyber cladding software attributes of $SWB_b$ that respectively indicate measures of cyber security that the attributes provide to $SWB_b$ to determine if CPA(b) provides $SWB_b$ with advantageous protection against cyberattacks. For example, for a user with high privilege access to MyCompany resources may be required by CPA(b) to run additional security checks and install additional security controls, such as EDR, in order to allow user access a MyCompany resource. Additionally, some capabilities that have impact on the system's vulnerability to cyberattacks may be constrained or disabled by CPA(b) if the user is accessing an unknown website or a websites with low security reputation (and therefore high risk). In an embodiment processing is performed by a neural network configured to operate on an input feature vector comprising component features based on components of HVR(e), HCC (e), UCR(n), and/or CPA(b).

Optionally, in a block 132 if the CyberSafe hub determines that the cladding protection is advantageous, the hub proceeds to block 140 and issues the requested token. If on the other hand the cladding protection is not advantageous, the hub may proceed to a block 134 to determine whether or not to amend the cladding protection to improve protection. If the hub decides not to amend, the hub may proceed to block 142 and deny the token and raise an alert. On the other hand if the decision is to amend the cladding, the hub proceeds to a block 136, amends the cladding and optionally proceeds to a decision block 138 to determine if the amendment has resulted in sufficient improvement in cyber protection or not. If the improvement is not sufficient CyberSafe hub proceeds to block 142 and denies the token.

Figure 3:
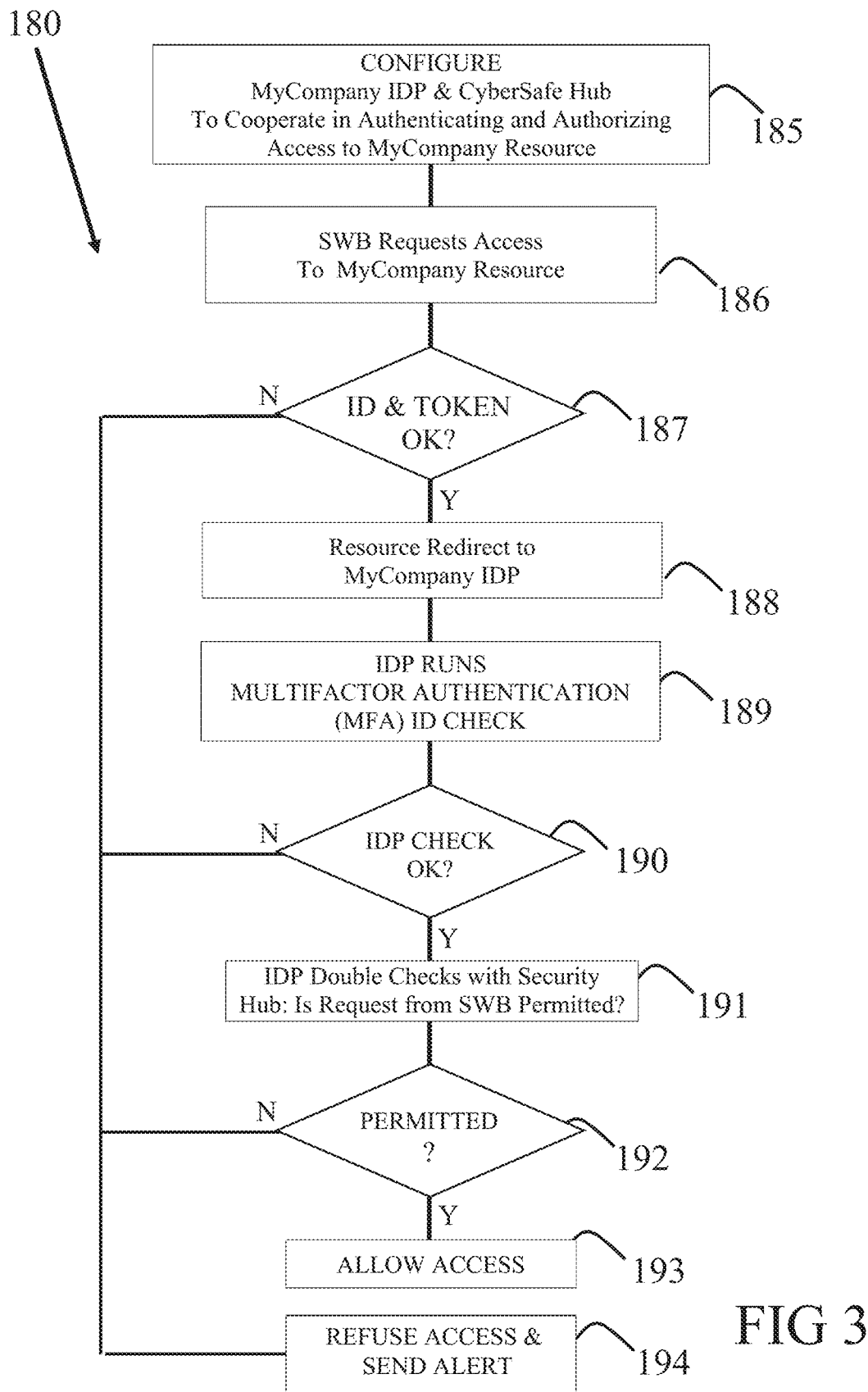
FIG. 3 shows a flow diagram of a procedure by which the SWB may be provided with authorization to access a MyCompany resource, in accordance with an embodiment of the disclosure.

FIG. 3 shows a flow diagram of a procedure 180 by which a user $U_n$ operating a $UE_e$ having a $SWB(n,e)_b$ may be provided with authorization to access a given MyCompany resource, in accordance with an embodiment of the disclosure. The parenthetical reference (n,e) in $SWB(n,e)_b$ makes explicit, which is implicit in the index b, that configuration of a given $SWB_b$ may be dependent on association of the given $SWB_b$ with a given user $U_n$ and a given user equipment $UE_e$, and also indicates that a given $UE_e$ may host more than one $SWB_b$, each configured for a different MyCompany user.

In a block 185 CyberSafe configures a MyCompany IDP (Identity Provider) and CyberSafe hub 52 to cooperate in authenticating and authorizing a user $U_n$ operating a $UE_e$ to access a given MyCompany resource, for example a cloud based resource 22 or an on-premise resource 28 (FIG. 1).

In a block 186 user $U_n$ operates $SWB(n,e)_b$ in $UE_e$ to submit the identity $B-ID_b$ of $SWB(n,e)_b$ together with a request to access the given MyCompany resource and notify the CyberSafe hub via a tunnel (FIG. 1) of the request. In a decision block 187, the given MyCompany resource optionally checks to determine if $SWB(n,e)_b$ has a CyberSafe security token issued by the CyberSafe hub, optionally in accordance with CyberSafe procedure 100 illustrated in FIGS. 2A-2C.

If $SWB(n,e)_b$ does not possess the CyberSafe security token, the given MyCompany resource proceeds to a block 194 and refuses the requested access and raises an alert. On the other hand, if $SWB(n,e)_b$ comprises the CyberSafe security token, optionally in a block 188 the MyCompany resource redirects $SWB(n,e)_b$ to MyCompany's IDP. Optionally, in a block 189 the IDP runs a multifactor authentication (MFA) ID check on user $U_n$ and if in a decision block 190 the multifactor check is determined not to be OK proceeds to block 194 and refuses the request access.

On the other hand, if the MFA ID check is OK, in a block 191 the given MyCompany resource double checks the request submitted by $SWB(n,e)_b$, and queries CyberSafe hub 52 as to whether or not $SWB(n,e)_b$ has notified the CyberSafe hub of the request and if $U_n$ is authorized to access the given MyCompany resource. In a decision block 192 if the hub corroborates the request and confirms permission, optionally in a block 193, the given MyCompany resource allows the requested access.

Figure 4:
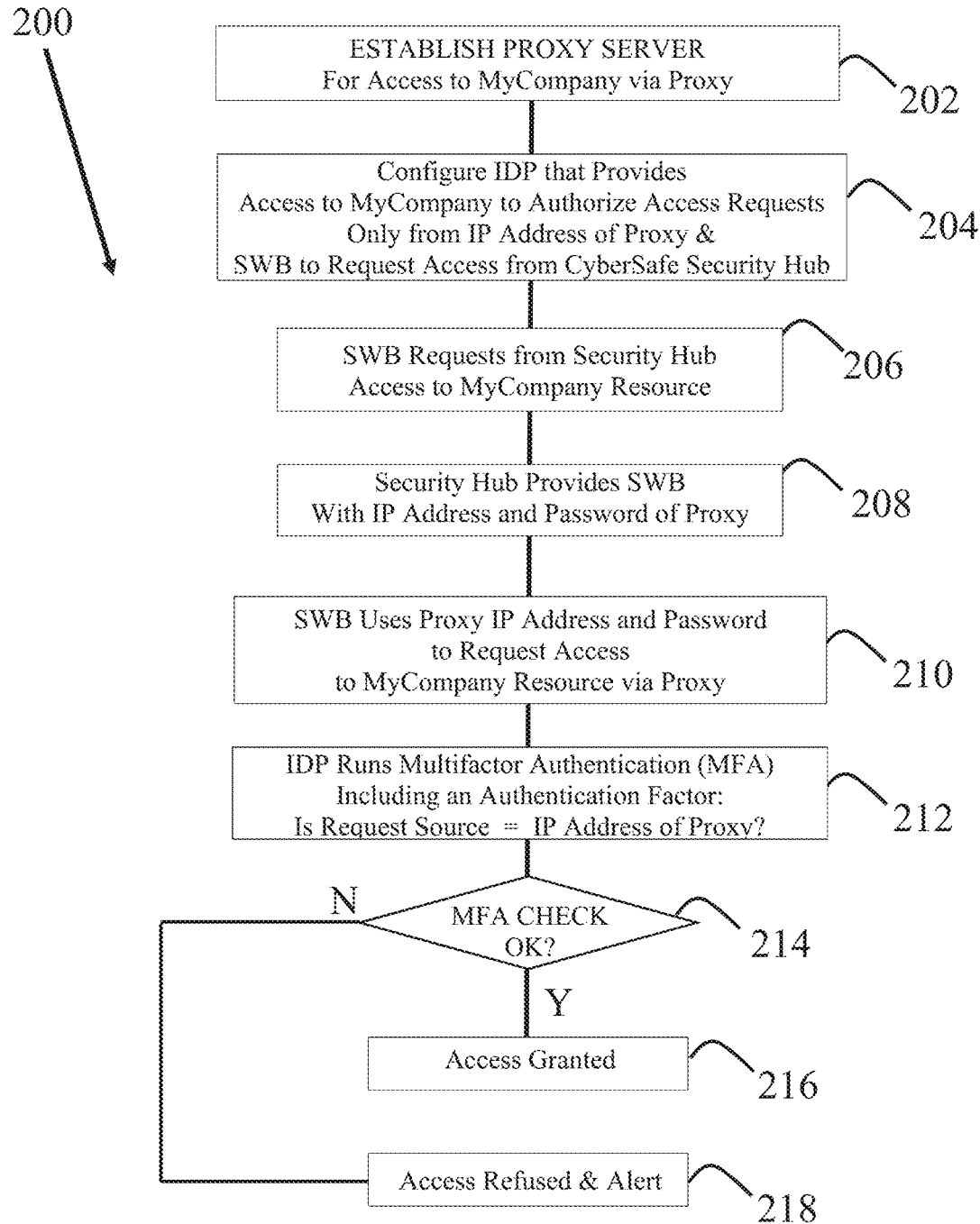
FIG. 4 shows a flow diagram of another procedure by which the SWB may be provided with authorization to access a MyCompany resource, in accordance with an embodiment of the disclosure.

FIG. 4 shows a flow diagram of another procedure, a procedure 200, by which a user $U_n$ operating a $UE_e$ having a $SWB(n,e)_b$ may be provided with authorization to access a given MyCompany resource, in accordance with an embodiment of the disclosure.

In a block 202 CyberSafe optionally instantiates a Proxy Server for providing access to a MyCompany resource and in a block 204 configures an IDP of MyCompany to authorize access to a MyCompany resource only from the proxy and $SWB(n,e)_b$ to request access from the proxy.

In a block 206 user $U_n$ operates $SWB(n,e)_b$ to request access to a given MyCompany resource and $SWB(n,e)_b$ connects to the CyberSafe security hub to request the access. In a block 208 the security hub provides $SWB(n,e)_b$ with an IP address of the proxy and a password for access to the proxy services. Optionally, in a block 210 $SWB(n,e)_b$ uses the proxy address and password to request access to the given MyCompany resource via the proxy. Upon receiving the request the IDP associated with MyCompany runs optionally a multifactor authentication (MFA) check on the request. The multifactor check optionally includes, in addition to a multifactor check on user $U_n$, a check as to whether or not the request was received from the IP address of the proxy. In a decision block 214 if the source address is the IP address of the proxy, and the authentication factors associated with the user identity are verified, in a block 216 access to the given MyCompany resource is granted. On the other hand, if the MFA fails, in a block 218 access is refused and $SWB(n,e)_b$ raises an alert to the refusal.

Figure 5A:
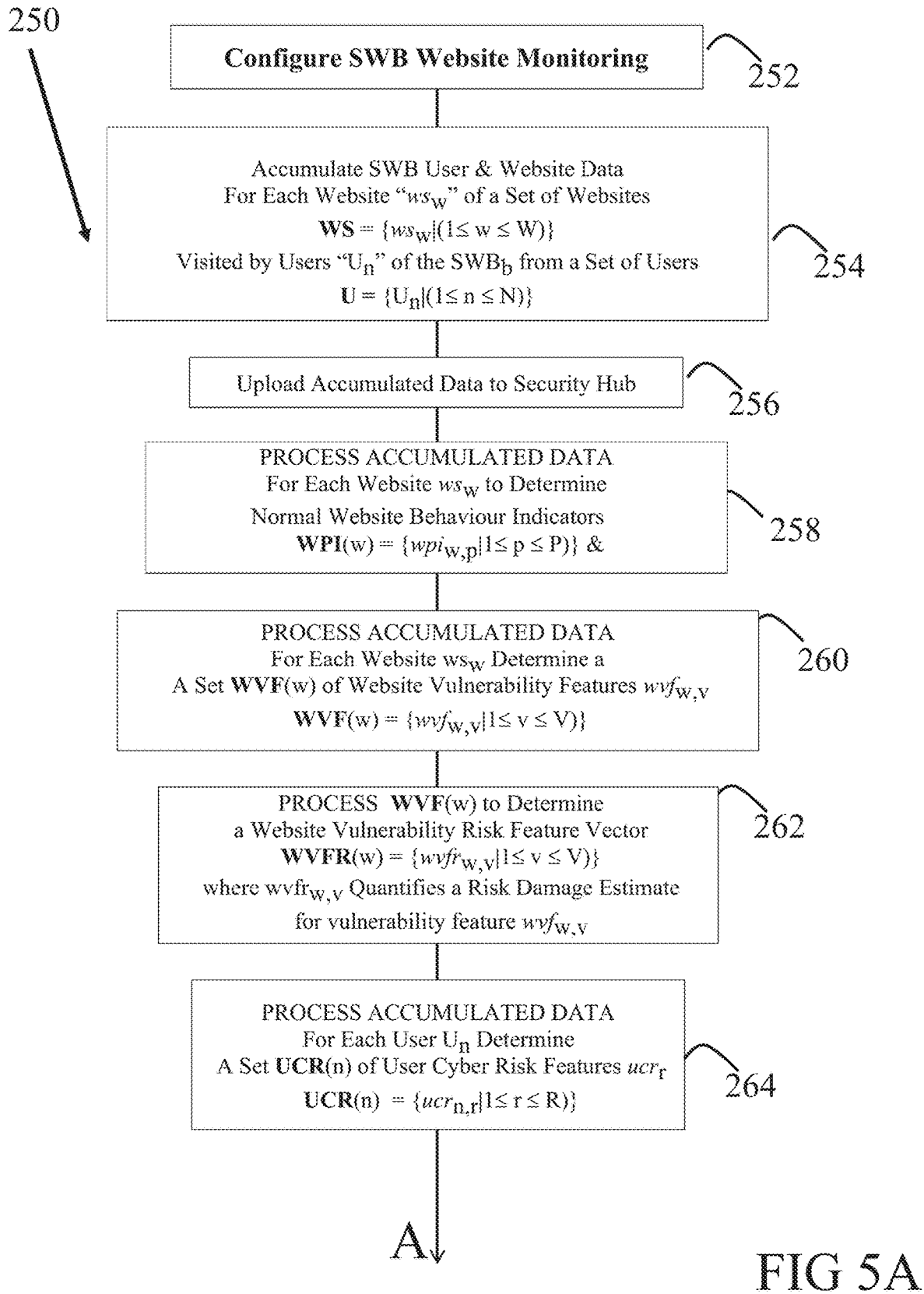
FIGS. 5A and 5B show a flow diagram of a procedure in accordance with which CyberSafe may acquire and process data to estimate possible cyberattack risks to MyCompany resources associated with access to websites, and to control access of a MyCompany user to the websites using the SWB, in accordance with an embodiment of the disclosure.
Figure 5B:
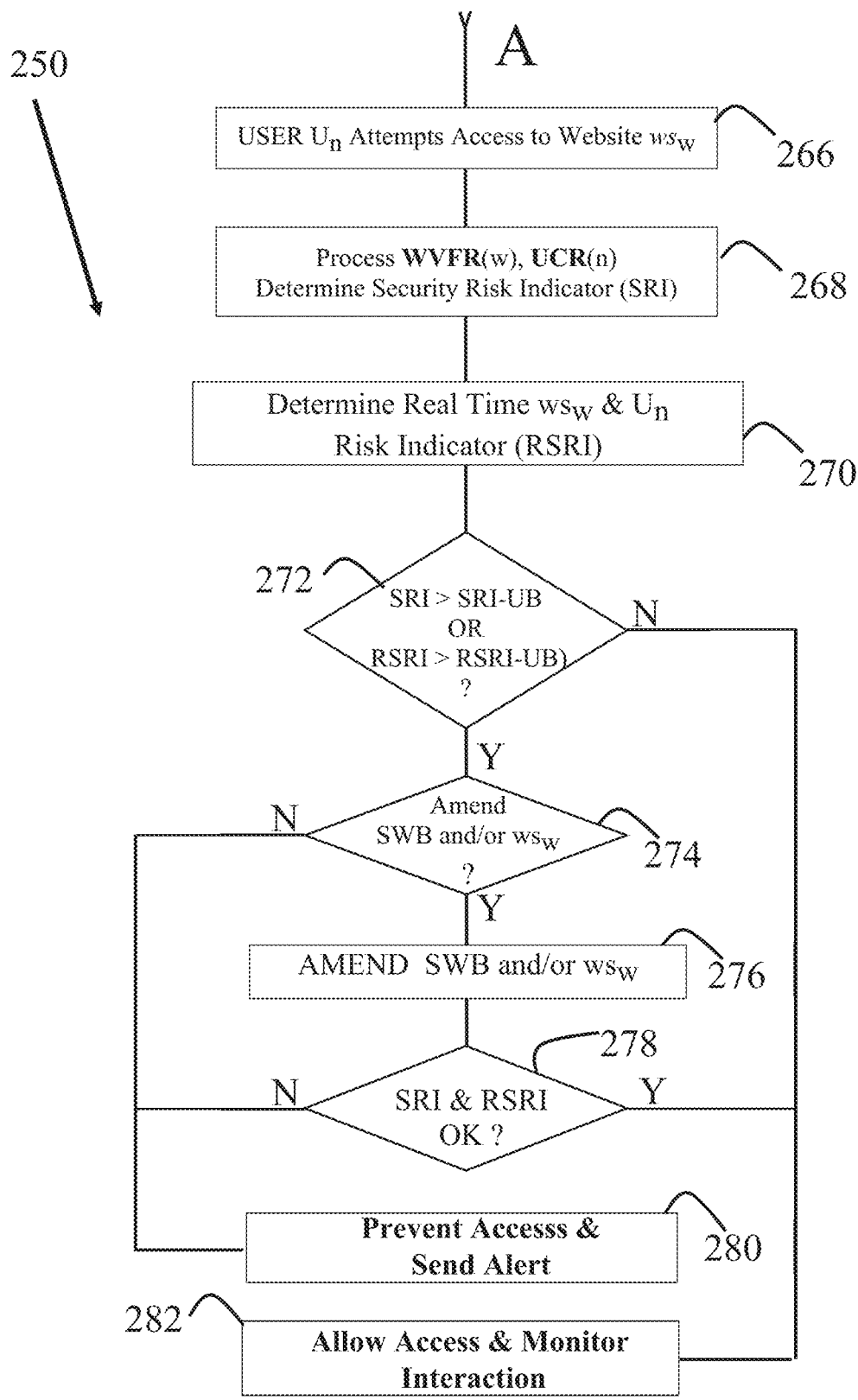

FIGS. 5A and 5B show a flow diagram of a procedure 250 by which CyberSafe operates to provide high visibility monitoring of MyCompany user browsing activity and protect MyCompany resources from cyber damage resulting from browsing behaviour of a user $U_n$.

In a block 252 CyberSafe configures browsers $SWB_b$ to monitor communications of MyCompany users and acquire data characterizing user browsing activities and websites that the users visit. Optionally, in a block 254, browsers $SWB_b$ monitor browsing of MyCompany users $U_n$ from a set U={$U_n$|(1≤n≤N)} of users to acquire data that may be used to characterize the users' browsing behavior and websites the users visit for each website "$ws_w$" of a set of websites $WS=\{ws_w|(1\leq w\leq W)\}$ visited by the users.

In an embodiment monitoring browsing activity comprises monitoring communications between a user $U_n$ and a website $ws_w$ via a $SWB_b$, storing and processing data comprised in the monitored communications and making the data available to the CyberSafe hub and to MyCompany IT and/or to local analysis by an application in the CISE. In an embodiment, monitoring is performed on communications outgoing from CyberSafe isolated environment CISE 62 (FIG. 1) and/or SWB 64 (FIG. 1) before the outgoing communications are encrypted by $SWB_b$ and on communications incoming into CISE after the incoming communications are decrypted by $SWB_b$. As a result, user browsing is substantially completely visible to CyberSafe and to MyCompany and available for local processing and security analysis. Monitoring may be continuous, stochastic, or periodic. Continuous monitoring comprises substantially continuous monitoring of communications for a duration of a session engaged in via a $SWB_b$ between a user $U_n$ and a website $ws_w$. Stochastic monitoring comprises monitoring of the communications for monitoring periods of limited duration that begin at onset times that are randomly determined, optionally in accordance with a predetermined probability function. Periodic monitoring comprises continuous monitoring of the communications during monitoring periods at periodic onset times. Monitored communications may be mirrored to a destination in CyberSafe hub and/or MyCompany or may be filtered for data of interest before being transmitted to a destination in CyberSafe hub and/or MyCompany. Features and constraints that configure how monitored communications are handled by $SWB_b$ may be determined responsive to CyberSafe and/or MyCompany policy.

In a block 256 the acquired data may be uploaded to the CyberSafe hub 52 (FIG. 1). Optionally, in a block 258 the CyberSafe hub processes the uploaded data to determine a set WPI(w) of behavior profile indicators $wpi_{w,p}$ that characterize or may be used to characterize normal interaction of MyCompany users with a website $ws_w$ when the users access the website. Optionally, the hub generates for website $ws_w$ a WPI(w), referred to as a user specific WPI(w), for each MyCompany user $U_n$. The profile indicators $wpi_{w,p}$ of a user specific WPI(w) determined for a given user characterize normal website behaviour of the given user when the given user accesses the website. In an embodiment, the hub generates a WPI(w), referred to as a group WPI(w), that characterizes normal website behavior for a group of MyCompany users as a collective. The profile indicators $wpi_{w,p}$ of the group WPI(w) may be, optionally weighted, averages of user specific profile indicators $wpi_{w,p}$ determined for individual members of the group of MyCompany users.

An exemplary user specific WPI(w) and/or a group WPI(w) may comprise at least one, or any combination of more than one of profile indicators $wpi_{w,p}$ such as:

$wpi_{w,1}$ = average frequency of access;

$wpi_{w,2}$ = average time spent on the website;

$wpi_{w,3}$ = amount of data transferred to download web pages associated with the website;

-continued $wpi_{w,4}$ = numbers and types of web page resources downloaded from the website;

$wpi_{w,5}$ = APIs, such as HTML5 and DOM APIs, that the website uses;

$wpi_{w,6}$ = number and types of links that direct out of the website;

$wpi_{w,7}$ = information that website requests from user (name, gender, location, credit card ... );

$wpi_{w,8}$ = content type of the website (news, social network, sports, banking, porn, gambling ... );

$wpi_{w,9}$ = permissions;

⋮

$wpi_{w,P}$.

It is noted that some profile indicators listed above may be compound profile indicators that comprise a plurality of related indicators. For example, $wpi_{w,3}$=number and types of resources, generally comprises a plurality of different resources bundled with website pages.

Optionally, in a block 260 the uploaded data is processed to determine a set $WVF_w$ of website vulnerability features $wvf_{w,v}$, for website $ws_w$, where $WVF(w)=\{wvf_{w,v}|(1\leq v\leq V)\}$, which as a result of connecting to website $ws_w$ may render $SWB_b$ and/or MyCompany resources accessed by $SWB_b$ vulnerable to cyber damage. Vulnerability features may be functions of profile indicators $wpi_{w,p}$. For example, outlier values of profile indicators $wpi_{w,p}$ for a given website $ws_w$ may indicate an attack surface of the website that results in enhanced vulnerability to and risk of damage from a cyberattack. In accordance with an embodiment, a measure of vulnerability associated with a given profile indicators $wpi_{w,p}$ for the website may be provided by a degree to which a value for the given profile indicator $wpi_{w,p}$ for the website deviates from an average value $\overline{wpi}_{w,p}$ of the $wpi_{w,p}$. The average $\overline{wpi}_{w,p}$ may be an average determined for MyCompany users, or an "extended average", which may be an average determined for users of a plurality of different enterprises that may include MyCompany. A degree of deviation of a given $wpi_{w,p}$ from $\overline{wpi}w,p$ may be measured in units of a standard deviation a associated with $\overline{wpi}_{w,p}$. Vulnerability features may be features that are not directly dependent on features that are considered website profile indicators or are advantageously considered separately from website profile indicators. For example, a number of links that a given website may have to malicious or cyber risky websites may be a vulnerability feature for a website that is advantageously considered to be independent of a total number of links that the website has to other websites.

An exemplary WVF(w) may comprise at least one, or any combination of more than one of vulnerability features $wvf_{w,v}$ listed below. In the list, vulnerability features which are considered dependent on a deviation from an average of a corresponding website profile $wpi_{w,v}$ are written as equal to a function $\mathscr{F}(\sigma, \overline{wpi}_{w,v})$.

$wvf_{W,1} = \mathscr{F}(\sigma, \overline{wpi}_{W,1})$ – function of deviation from frequency of access;

$wvf_{W,2} = \mathscr{F}(\sigma, \overline{wpi}_{W,2})$ – function of deviation time spent on the website;

-continued $wvf_{W,3} =$ $\mathcal{F}(\sigma, \overline{wpi}_{W,3})$ – function of deviation from amount of data transferred;

$wvf_{W,4}$ = is website black listed?;

$wvf_{W,5}$ = number of links to malicious websites;

$wvf_{W,6}$ = number and types of requests for sensitive information (credit card numbers, social security number);

$wvf_{W,7}$ = out of context webpage content;

$wvf_{W,8}$ = unnecessary permissions;

$wvf_{W,9}$ = flash cookies;

$wvf_{W,10}$ = addressed by or includes URL shorteners;

$wvf_{W,11}$ = URLs with inconsistent features;

:

In a block 262 CyberSafe hub 52 optionally determines a website vulnerability risk feature vector WVFR(w)={wvfr$_{w,v}$|1≤v≤V)} where wvfr$_{w,v}$ quantifies a cyber damage risk level that may be associated with vulnerability wvf$_{w,v}$. In an embodiment CyberSafe may use a neural network to assign risk levels to vulnerabilities. Optionally, CyberSafe may use heuristic classification to assign risk levels to vulnerabilities.

Optionally, in a block 264 CyberSafe hub 52 processes the uploaded data to determine for each user $U_n$ a user profile that characterizes a cyber risk profile of the user optionally comprising a set UCR(n)= of risk components ucr$_{n,r}$ (1≤r≤R), where UCR(n)={ucr$_{n,r}$|1≤r≤R)}, that may be used to characterize behavior features of user $U_n$ that expose CyberSafe and/or MyCompany to cyberattack. Determining risk components ucr$_{n,r}$ optionally comprises determining a set of browsing behaviour features and for each of the determined browsing features estimating a degree of risk to which the behaviour feature exposes SWB$_b$ and/or MyCompany resources.

An exemplary UCR(n) may comprise at least one, or any combination of more than one of profile indicators ucr$_{n,r}$ such as:

$ucr_{n,1}$ = risk from careless password management;

$ucr_{n,2}$ = risk from careless permissions management;

$ucr_{n,3}$ = risk estimate from reckless clicking on actionable content;

$ucr_{n,4}$ = risk estimate from deficient sensitivity to phishing bait;

$ucr_{n,5}$ = risk estimate for user having high privilege in MyCompany resources

:

$ucr_{n,R}$.

In a block 266 a user $U_n$ uses SWB$_b$ to attempt a connection to a website ws$_w$ and SWB$_b$ optionally notifies CyberSafe hub 52 of the attempt. In response to the notification the hub, optionally in a block 268 processes WVFR (w) and UCR(n) to provide a value for a Security Risk Indicator (SRI) that provides an estimate of cyber damage risk that might result from the connection. And in a block 270 the hub or the SWB$_b$ may examine the website to determine a Realtime Security Risk Indicator (RSRI), which is responsive to changes in the website and/or a current virtual model of an interaction of the user $U_n$ with website ws$_w$.

Examining website ws$_w$ to determine RSRI may comprise determining if there are changes in vulnerability features wvf$_{w,v}$ of WVF(w) and thereby in risk feature vector WVFR (w) that generate statistically significant differences between SRI and RSRI. In an embodiment to determine an RSRI web browser, SWB$_b$ may download webpages from website ws$_w$ to a secure sandbox in CISE and before rendering a webpage from the website check behaviour of a resource bundled with the webpage to determine if the webpage and resource are benign. Optionally, web browser SWB$_b$ may model behaviour of user $U_n$ in interacting with an emulation of the website to determine a probability of user $U_n$ clicking on actionable content presented by the website that could result in cyber damage. For example, SWB$_b$ may run an experiment in the sandbox to determine if an emulation of website ws$_w$ generates phishing bait, and if phishing bait is generated would a $U_n$ avatar based on UCR(n) click on the phishing bait.

In an embodiment, values for SRI and/or RSRI may be determined by a neural network operating on an input feature vector having components that are, or are based on, components from at least one or any combination of more than one of sets WVF(w) WVFR(w) and/or UCR(n). Optionally values for SRI and/or RSRI are determined based on heuristic models of ws$_w$ and or $U_n$.

In a decision block 272, CyberSafe browser SWB$_b$ may determine if security risk indicator SRI is greater than a predetermined maximum upper bound SRI-UB or RSRI is greater than a predetermined maximum allowable upper bound SRI-UB. If neither of the risk indicators is greater than its respective upper bound, SWB$_b$ may proceed to a block 282 and allow access to website ws$_w$ and operate to monitor interaction of user $U_n$ with website ws$_w$.

On the other hand, if one of SRI or RSRI is greater than its respective upper bound, SWB$_b$ may proceed to a decision block 274 to decide whether or not to amend the configuration of SWB$_b$ for supporting interaction of user $U_n$ and website ws$_w$ and/or functionalities of website ws$_w$. If browser SWB$_b$ decides not to amend, the browser may proceed to a block 280 prevent access to website ws$_w$ and alert CyberSafe hub of the refusal.

On the other hand, if SWB$_b$ decides in decision block 274 to amend, the browser optionally proceeds to a block 276 and amends the browser configuration for user $U_n$ and/or amends a functionality of website ws$_w$. By way of example, amending configuration of SWB$_b$ for user $U_n$ may comprise preventing $U_n$ from clicking on certain actionable content that website ws$_w$ displays, and amending website ws$_w$ may comprise changing website permissions and/or disabling a website link. Following amendment, browser SWB$_b$ may proceed to a decision block 278 to determine if the amendment was successful in reducing the SRI and/or the RSRI to acceptable values. If the amendment was successful in a block 282 browser SWB$_b$ connects user $U_n$ to ws$_w$ otherwise the browser proceeds to block 280 and prevents access of $U_n$ to ws$_w$.

Figure 5C:
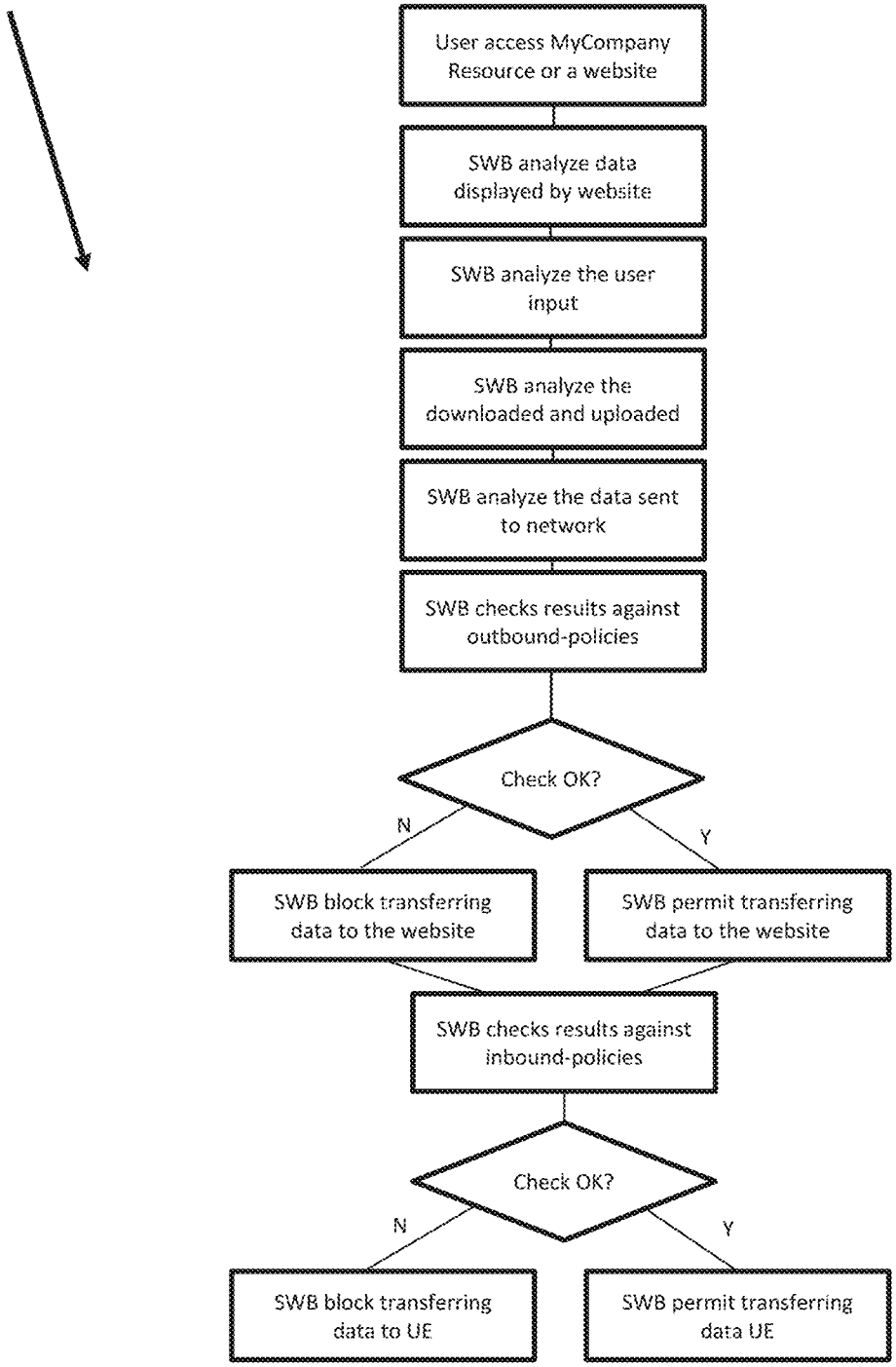
FIG. 5C shows a flow diagram that illustrates monitoring a sample scenario of an interaction of a MyCompany user with a website, in accordance with an embodiment of the disclosure.

In accordance with an embodiment, monitoring interaction of user $U_n$ with website ws$_w$ includes intervening with user activity to prevent a breach of security policy as indicated by an example scenario provided by a flow diagram 290 shown in FIG. 5C.

In an embodiment a procedure similar to that of procedure 250 is performed by CyberSafe to vet browser extensions that a MyCompany may wish to access and download. As with websites, a $SWB_b$ accumulates data for each of a set of extensions for which MyCompany users evidence interest. The data may be used to determine vulnerability features and vulnerability risk estimates which are used to determine whether and how to amend an extension and/or user interfacing with the extension, and whether to allow downloading and integrating the extension with browser SWB.

Figure 6A:
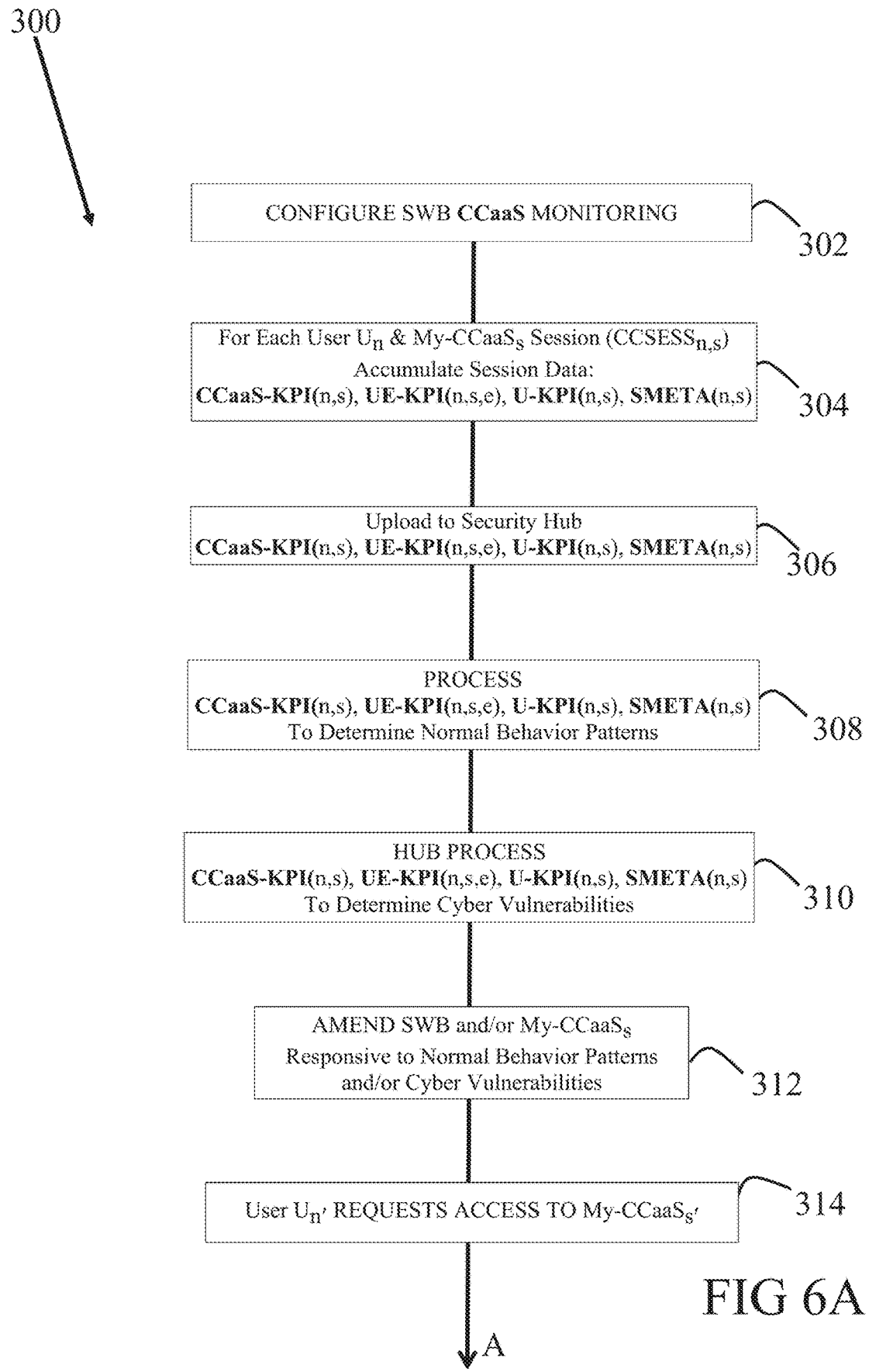
FIGS. 6A and 6B show a flow diagram of a procedure in accordance with which CyberSafe may operate to monitor and provide real time intervention of use of MyCompany CCaaS resources to provide cyber security to MyCompany resources, in accordance with an embodiment of the disclosure.
Figure 6B:
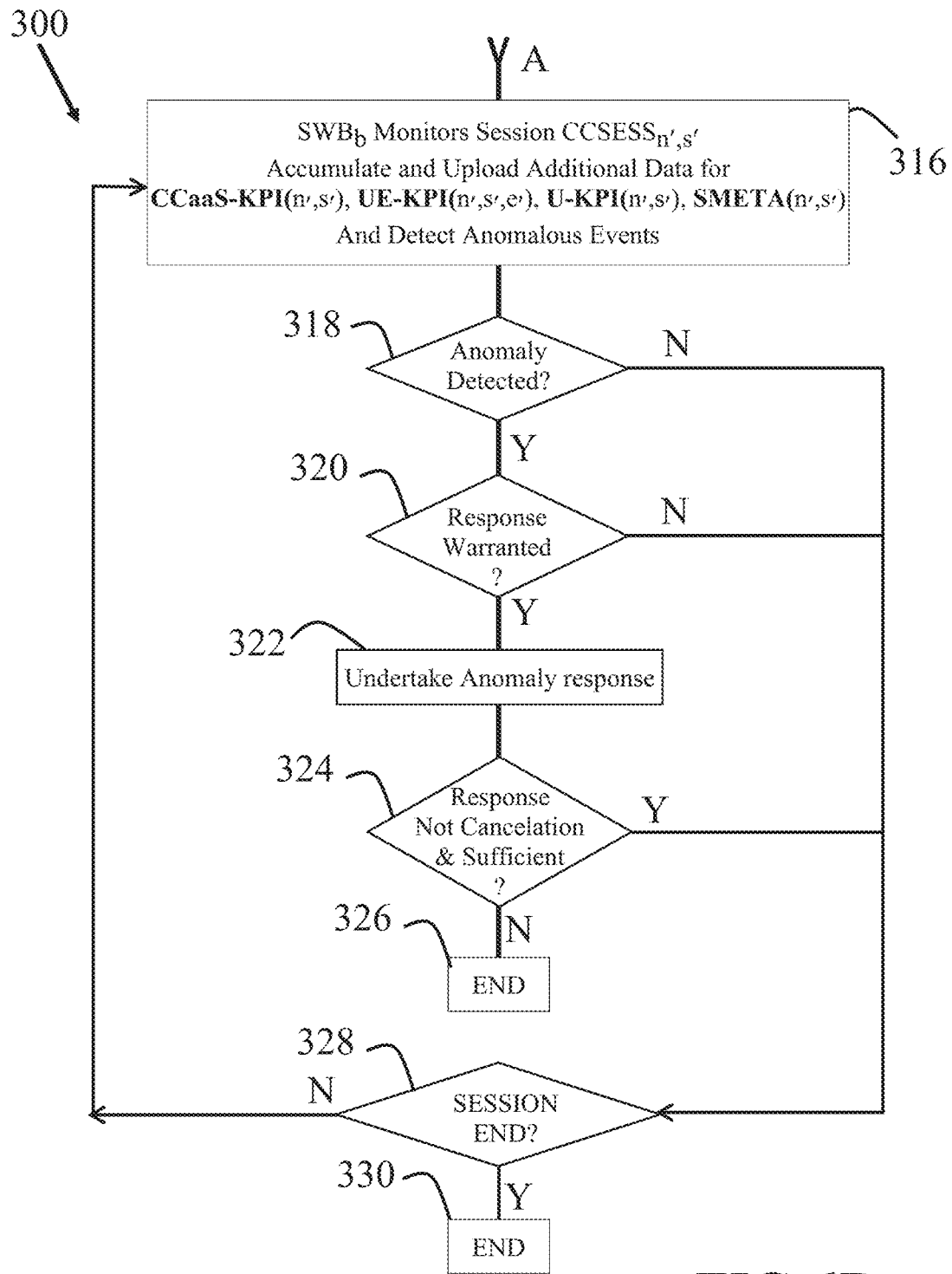

FIGS. 6A and 6B show a flow diagram of a procedure 300 by which CyberSafe operates to provide high visibility monitoring of MyCompany user of cloud computing and to protect MyCompany resources from cyber damage resulting from a MyCompany user accessing and using a MyCompany cloud computing resource, My-$CCaaS_S$, of a set My-CCaaS={My-$CCaaS_S$|(1≤s≤S)} of MyCompany cloud computing resources. A cloud computing resource My-$CCaaS_S$ may by way of example be an infrastructure-as-a-service (IaaS) resource, a platform-as-a-service (PaaS) resource, or a software-as-a-service (SaaS).

In a block 302 CyberSafe configures browsers $SWB_b$ to monitor cloud computing activity of MyCompany users and to acquire data characterizing MyCompany user cloud computing activities and My-$CCaaS_S$ resources that the users visit. Optionally, in a block 304 browsers $SWB_b$ monitor MyCompany use of cloud computing resources My-CCaaS and for a given user $U_n$ and My-$CCaaS_S$ session ($CCSESS_{n,s}$), a $SWB_b$ optionally accumulates data for sets CCaaS-KPI(n,s), UE-KPI(n,s), U-KPI(n,s), of key performance indicators (KPI) and data for a set SMETA(n,s) of session metadata components.

CCaaS-KPI(n,s) comprises values of KPIs that may be used to characterize operation of My-$CCaaS_S$ during session $CCSESS_{n,s}$. A CCaaS-KPI(n,s) may by way of example comprise KPIs that provide values for at least one, or any combination of more than one of: CPU usage; memory usage; bandwidth usage; response time to a user's request; throughput; latency; request error rate; resources accessed; permission changes; and/or network requests. UE-KPI(n,s,e) comprises values of KPIs that may be used to characterize operation of user equipment $UE_e$ that user $U_n$ uses to interact with $CCaaS_S$ during session $CCSESS_{n,s}$. A UE-KPI(n,s,e) may by way of example comprise KPIs that provide values for at least one, or any combination of more than one of: cpu usage; memory use; thread count; task execution times; security controls of the UE; history of data associated with the specific UE; risk score of the UE; and/or throughput. U-KPI(n,s) comprises values of KPIs that may be used to characterize actions of user $U_n$ during session $CCSESS_{n,s}$. A U-KPI(n,s) may by way of example comprise KPIs that provide values for at least one, or any combination of more than one of: user keyboard typing patterns; user mouse activity patterns; use of wrapped apps; use of shared secure services; data patterns used by the user during the session, including data typed locally in the SWB; files uploaded and downloaded, filenames; and/or interruptions to use ambient software. SMETA(n,s) optionally comprises indexing and descriptive data for a session $CCSESS_{n,s}$. A SMETA(n,s) may by way of example comprise data components that provide values for at least one, or any combination of more than one of: session IDs ($U-ID_n$, $UE-ID_e$, $B-ID_b$); Session ToD (Time of Day); session duration; identities of data and files uploaded; identities and data of files downloaded; and/or websites visited and website visit durations.

Optionally, in a block 306, browser $SWB_b$ uploads sets CCaaS-KPI(n,s), UE-KPI(n,s), U-KPI(n,s), and/or SMETA(n,s) to the CyberSafe security hub 52 (FIG. 1). And in a block 308 browser $SWB_b$ and/or the CyberSafe hub processes data provided by CCaaS-KPI(n,s), UE-KPI(n,s), U-KPI(n,s), and/or SMETA(n,s) to determine expected values of components of the sets. Expected values may be determined for a plurality of instances of session $CCSESS_{n,s}$ for user $U_n$ and My-$CCaaS_S$ and/or expected values for a plurality of My-$CCaaS_S$ sessions $CCSESS_{n,s}$ and a group of MyCompany users $U_n$ as a collective. In an embodiment, the expected values for a given user MyCompany user $U_n$ determine a user specific normal behavior pattern for a $CCSESS_{n,s}$, and the expected values for a group of MyCompany determine a group normal behavior pattern for a $CCSESS_S$ session.

Optionally, user specific normal behavior patterns and group normal behavior patterns determined by the CyberSafe hub and/or a browser $SWB_b$ are stored in a memory such as a cloud based memory associated with the CyberSafe hub or in a memory associated with $SWB_b$ such as in a memory of the secure encrypted file system of shared secure services 66 in CISE 62 (FIG. 1).

Optionally in a block 310, $SWB_b$ and/or the CyberSafe hub processes data provided by CCaaS-KPI(n,s), UE-KPI(n,s), U-KPI(n,s), and/or SMETA(n,s) to determine cyber vulnerabilities associated with MyCompany users using a My-$CCaaS_S$ and/or with a specific MyCompany user using the My-$CCaaS_S$. Optionally, in a block 312 CyberSafe hub and/or the $SWB_b$ amend features of the $SWB_b$ and/or My-$CCaaS_S$ responsive to the determined cyber vulnerabilities to moderate risks of cyber damage during a My-$CCaaS_S$ session. By way of example an amendment of My-$CCaaS_S$ may comprise, disallowing access to particular resources; preventing permission changes; and/or limiting network requests Amendments to $SWB_b$ may comprise configuring the $SWB_b$ to prevent uploading and/or download particular files and/or data and/or to limit duration of a My-$CCaaS_S$ session.

Optionally, in a block 314 a particular user $U_{n'}$ using a given browser $SWB_b$ in a given $UE_e$ requests and is permitted access to and use of a particular My-$CCaaS_{S'}$ and engages in a "current" session $CCSESS_{n',s'}$ with My-$CCaaS_{S'}$. In a block 316, the given $SWB_b$ monitors current session $CCSESS_{n',s'}$ to accumulate, process locally and upload data for CCaaS-KPI(n',s'), UE-KPI(n',s',e'), U-KPI(n',s'), SMETA(n',s') for the current session to add to data already accumulated, optionally by an $SWB_b$ other than the given $SWB_b$, for processing from previous sessions with My-$CCaaS_S$, to enforce MyCompany and/or CyberSafe policy, and/or to detect occurrence of anomalous events.

In an embodiment, an anomalous event is an event that breaches normal behavior or an event that breaches MyCompany and/or CyberSafe policy. By way of example, a breach of a normal pattern may comprise a deviation of a given KPI monitored by the given $SWB_b$ from an expected value of the KPI by an amount greater than a standard deviation established for the KPI multiplied by a predetermined coefficient. Optionally, a condition for deciding that an event is a breach of normal behavior and/or policy is user dependent and/or My-$CCaaS_S$ dependent. For example, for an inexperienced MyCompany user, definition of a breach may be less tolerant than for an experienced MyCompany user and as a result a KPI coefficient smaller than for the experienced MyCompany user. Enforcement of CyberSafe and/or MyCompany policy may by way of example entail preventing a MyCompany user from uploading, downloading, and/or modifying certain MyCompany files or data, accessing a website and/or a MyCompany resource. Preventing may comprise intercepting a draft of a communication composed by a MyCompany user before the user manages to transmit the communication from the user UE. Enforcing a policy may entail changing a permission or cancelling a current session $CCSESS_{n,s}$, blocking certain local access permissions in CISE and between CISE and other UE components In a block 318, if an anomalous event is not detected by the given $SWB_b$, the given $SWB_b$ may continue to a decision block 328 to determine if session $CCSESS_{n',s'}$ has ended. If the session has not ended, the given $SWB_b$ may return to block 316 to continue monitoring the session. Otherwise the given $SWB_b$ proceeds to a block 330 and ends monitoring. On the other hand if an anomalous event is detected, optionally in a decision block 320 the given $SWB_b$ determines if, based on CyberSafe hub 52 (FIG. 1) and/or MyCompany policy, the anomalous event warrants a response. If a response is not warranted, the given $SWB_b$ may continue to decision block 328 to determine if session $CCSESS_{n',s'}$ has ended, and if the session has not ended, returns to block 316 to continue monitoring the session. On the other hand, if a response is warranted, the given $SWB_b$ may proceed to a block 322 to undertake a response. A response may comprise enforcing a MyCompany and/or CyberSafe policy and undertaking an action noted in the preceding paragraph. If the response is not a cancelation and is considered sufficient under MyCompany and/or CyberSafe policy at block 324 then the given $SWB_b$ may continue to decision block 328 to determine if session $CCSESS_{n',s'}$ has ended, and if the session has not ended, returns to block 316 to continue monitoring the session. If, on the other hand, the anomaly response is not sufficient or involves cancelation as determined at block 324 then the given $SWB_b$ proceeds to a block 326 and ends session $CCSESS_{n',s'}$.

It is noted that in the above discussion various actions are described as performed by one or the other of CyberSafe hub 52 and CyberSafe browser $SWB_b$ 64. However, in accordance with an embodiment of the disclosure, actions performed by one of CyberSafe hub 52 and CyberSafe browser $SWB_b$ may be performed by the other or may be performed by CyberSafe hub 52 and browser $SWB_b$ cooperating.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

Figure 7:
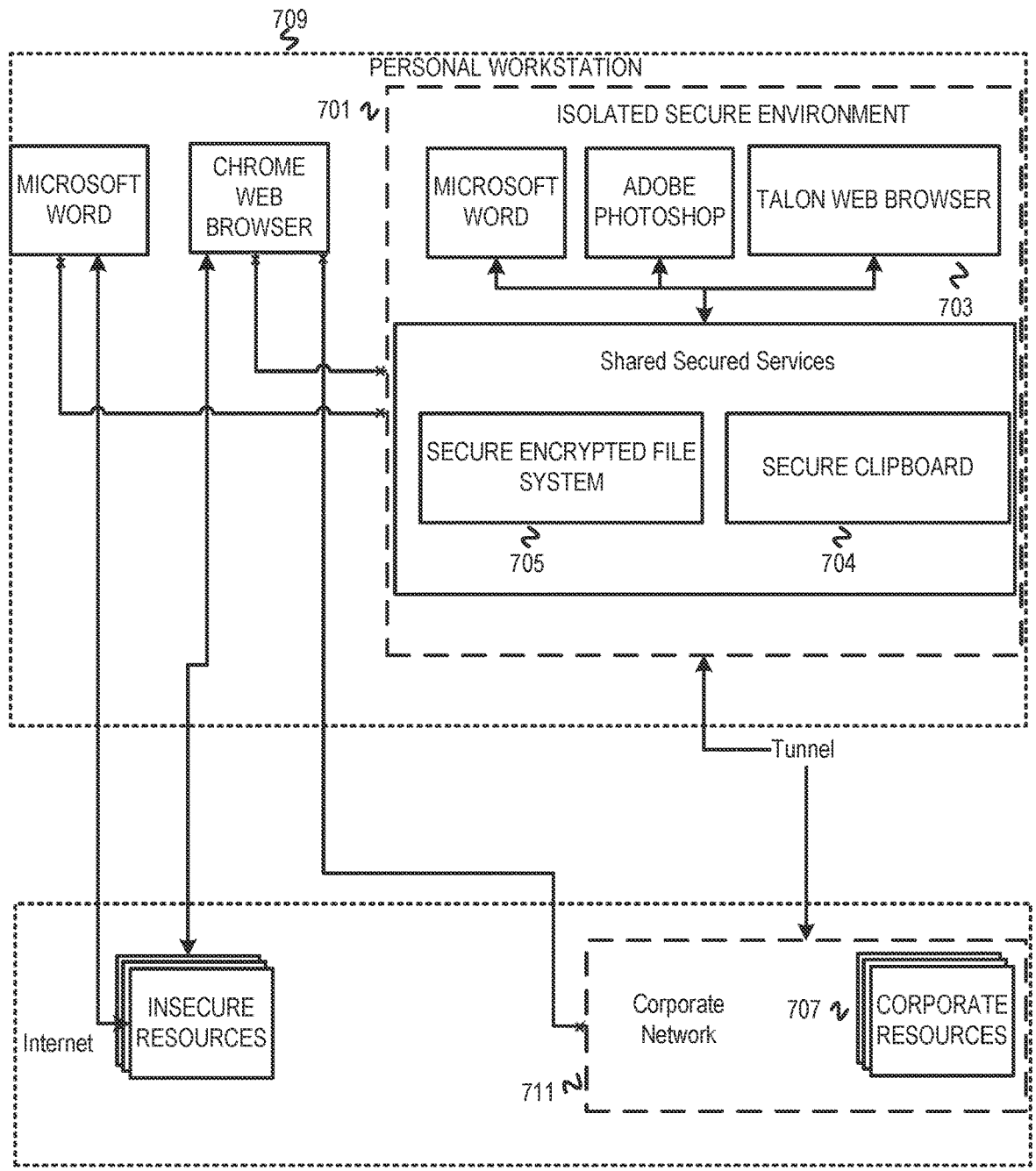
FIG. 7 depicts a diagram of a personal workstation with an Isolated Secure Environment.

FIG. 7 depicts a diagram of a personal workstations with an Isolated Secure Environment.

Talon Isolated Secure Environment (TISE)

Value proposition

Talon features a Talon Isolated Secure Environment 701 (TISE) which implements isolation between the personal employee environment and the corporate work environment on end point devices, improving the security and privacy, for accessing corporate resources 701, in a simpler and more cost-efficient manner, compared to other security solutions. It increases the challenge for a malware present on an end point device 709 to tamper with the TISE 701 nor access information or artifacts downloaded to the end point 709 using the TISE 701.

Definition

The Talon Isolated Secure Environment 701 (TISE) is a special environment that may support corporate applications running locally, and/or a Talon secure web browser 703 (TSWB) and/or a Talon secure web browser extension.

The TISE 701 allows data to be securely and privately transferred between the applications, secure connection for the applications and the corporate remote infrastructure and assets and many local and SaaS based security features, separated from other applications outside the environment, based on a predefined policy.

The TISE 701 may run on computers, laptops, smartphones, tablets, virtual environments and any other relevant endpoint environment, managed or unmanaged by an organization.

Terminology

The TISE 701—the Talon Isolated Secure Environment 701 running on the endpoint 709. The TISE 701 may include the TSWB 703 and additional components to allow isolation of additional applications, or may include only the TSWB 703. See relevant section.

TSWB 703—Talon Secured Web Browser 703 running on the endpoint 709. Part or all of the TISE 701. May be an independent application, a component integrated in a browser, or a browser extension. See relevant section.

Talon—Talon may refer to the any component developed by Talon Cyber Security

Ltd, and may include any combination of the following: the TISE 701, the TSWB 703, Talon Backend components running on premise or in the cloud.

IDP—An identity provider (abbreviated IdP or IDP) is a system entity that creates, maintains, and manages identity information for principals and also provides authentication services to relying applications within a federation or distributed network.

MFA—Multi-factor authentication is an authentication method in which a computer user is granted access to a website or application only after successfully presenting two or more pieces of evidence (or factors) to an authentication mechanism: knowledge (something only the user knows), possession (something only the user has), and inherence (something only the user is).

AV—Antivirus software is a computer program used to prevent, detect, and remove malware.

EDR—Endpoint detection and response software are used to identify and protect endpoints from threats. EDR solutions provide additional and more sophisticated means of detection and protection compared to standard AV software, such as using AI-based methods, heuristics or gathering logs from many endpoints to a single location and analyzing them.

JWT—JSON Web Token is an open standard that defines a compact and self-contained way for securely transmitting information between parties as a JSON object. This information can be verified and trusted because it is digitally signed. JWTs can be signed using a secret or asymmetric encryption.

Compliance with regulations and policies

The TISE 701 creates an isolated and secure environment, allowing employees to access sensitive corporate and customer information, on managed and on unmanaged devices.

The environment 701 may support compliance specifications such as SOC 2, PCI DSS and HIPAA compliance for work-related activity.

Here are some examples of how Talon allows companies to comply with strict regulations:

- HIPAA mandates complete network encryption. The TSWB 703 and the TISE 701 encrypt traffic by hooking into operating system functions, and disallowing non-encrypted HTTP traffic from the browser.
- HIPAA mandates that all information being accessed is encrypted at rest. Talon encrypts information, including downloaded files locally.
- PCI DSS regulation allows to use network segmentation to differentiate between an environment that needs to comply with PCI DSS and an environment which does not. The Talon ISE 701 is isolated on the network level, which means it allows organizations to enable their employees to use their personal devices while complying with the requirements of PCI DSS.

Managing access to the corporate resources 707

Determining environment type

Identify connecting device type

The TISE 701 may operate differently based on the type of the device being used.

Talon may use different methods such as operating system functions and information locally, or remote headers such as the User Agent to identify the device type being connected from remote.

A corporate policy may define which device is allowed by its type and in which configuration should be used with Talon. Based on the device type, or if an unsupported device or operating system version is being used, an action may be triggered according to section "Optional action types as a result of a trigger", as well as remediation-related actions.

Identify corporate or personal, managed or unmanaged device type

Talon may decide to operate in a secured or an unsecured environment by identifying whether the device is a corporate-owned device or not. Talon may do this using various methods such as scanning for hardware (MAC addresses, BIOS/UEFI functions, operating system functions, driver calls, TPM/HSM functions, etc) or by integrating with APIs which the device manufacturers own. Talon may also identify whether the device is a corporate device by verifying an operating system license, a device license, application licenses of applications running on the machine, integration with corporate MDM or anti-virus solutions, and other similar mechanisms.

If a non-corporate device is being used against corporate policy, an action may be triggered according to section "Optional action types as a result of a trigger".

Identify by group

Talon may decide on the way of operation based on the corporate group the user is part of, by integrating with the corporate IDP or a corporate AD. This requires the user to first log in using the browser with the corporate IDP.

If the user is not allowed access to the secured environment, an action may be triggered according to section "Optional action types as a result of a trigger".

Access validation

Secured access to corporate resources

Talon may feature different types of limitations on users when attempting to access corporate resources 707. It may do so using different methods, for example:

Talon's server side may enforce that accessing corporate resources 707 (either SaaS or on-premises) will be done using the TISE 701.

Talon may integrate with a forward proxy solution, or integrate with a reverse proxy solutions, or may feature a reverse proxy solution, which verifies that it has been accessed by the TISE 701

- Talon may integrate with an IDP to ensure that the corporate resources 707 are being accessed using the TISE 701 (see section "methods to integrate with IDP for access control")
- Talon may integrate with other security products such as IAM, MDM and EDR solutions to limit the functionality of applications on the endpoint 709, or their use.
- Talon may introduce a centralized web proxy which allows both the TSWB 703 and non-Talon browsers to connect to.
- Talon may register a keypair which was created locally on the TISE 701 or in the local TPM/HSM and use the key to authenticate with a proxy, an IDP, or any other corporate resources 707 with a special piece of information which the TISE may 701 provide.

Talon may allow, block or partially allow and/or block access to corporate resources 707 according to corporate policy, depending on one or more factors, combined or alone. For example:

- Whether a corporate or a personal device is used to access the service. The location of the user trying to access the service
- Which service is being accessed.
- The URL being accessed.
- The user accessing the service.
- The groups which the user accessing the service is associated with.
- The time in the day in which the user is accessing the service
- Whether or not the service is a SaaS service or an on-prem installed service.
- The type of authentication being used with the user.
- The type of activity used in the service
- Whether or not MFA has been used
- Whether or not TPM/HSM have been used
- The risk level associated with the user. Connection type which the user is using to access the service (cellular, wifi, LAN, etc)
- The security type which is associated with the connection (for example, WPA2 Personal for WLAN connections).
- Whether or not the device is managed by the organization, or enrolled in any way to the organization
- Applications installed on the device (security related and non-security related).
- Whether or not the device has specific utilities installed (e.g. AV/EDR/MDM/etc).
- Device type
- Type of browser.
- Security posture of the device (including update status of the OS and SW) And more.

Identify and take action when accessing corporate services from non TISE

Talon may allow users to use the corporate resources 707 only from the TISE 701. In this case, users may have to authenticate using the TISE 701 with the corporate services using some sort of corporate Single sign-on mechanism based on the corporate IDP, LDAP, OAuth, SAML. username or password authentication, Multi-factor authentication, HSM/TPM, and other mechanisms. The most common use case is deferring the user authentication to the corporate IDP Once the user is authenticated via the TISE 701, the corporate policy can determine under which circumstances they are allowed to access the corporate resources 707, specified in section "Secured access to corporate resources".

If the user is not authenticated, or is not using the TISE 701, it may be restricted to access the service or resource, based on factors specified under "Secured access to corporate resources". In this case, an action may be triggered according to section "Optional action types as a result of a trigger".

Figure 8:
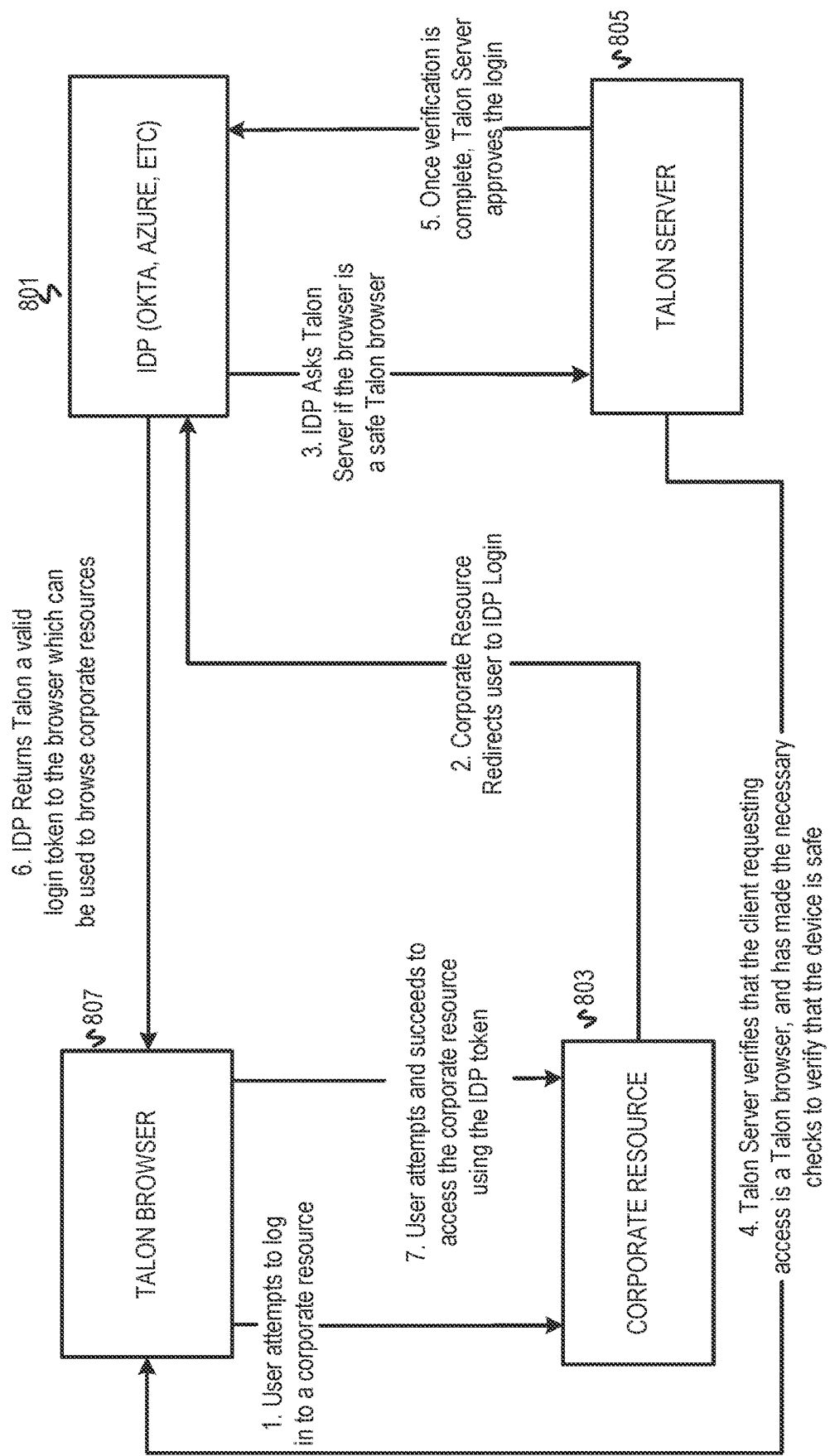
FIG. 8 is a diagram of integrating with an IDP for access control.

FIG. 8 is a diagram of integrating with an IDP for access control.

Methods to integrate with IDP for access control

Talon may include mechanisms which allow the corporate resources 707 and internet gateways to integrate with the TISE 701 for better access control.

This integration may serve one or more of the following corporate access goals:
- Block access from non-managed devices, not accessing via a TSWB 807 or the TISE 701 applications to corporate services or resources
- Block access from managed devices, not accessing via the TSWB 807 or the TISE 701 applications to corporate services or resources
- Block access from application to corporate services on devices with the TISE 701 for application that are not configured in the TISE 703
- Apply different access policies to corporate services for different scenarios, for example
  - Devices registered as managed or controlled by corporate management system
  - Devices without the TISE 701 deployed
  - Devices with the TISE 701 deployed Here are some examples of capabilities which Talon might feature to integrate with a corporate IDP 801:
- A Talon-aware secure proxy (both forward proxy to the internet or a reverse proxy access to local resources)— capable of identifying the TISE 701 using a cryptographic method that recognizes that the TISE 701 is indeed authenticated with the proxy. This allows any browser or application to use the proxy but also allows the proxy to enforce a different policy on the TISE 701 applications and the TSWB and, for example, allow them to connect to secure a corporate resources 803.
- Integration with the corporate IDP 801 to pass a unique token that only the TISE 701 can provide. The factor will be used either during the authentication process, or while accessing through a Talon-aware proxy. The token can be provided via places such as:
  - Changing the user agent
  - A custom HTTP header
  - A SAML request
  - A signed JWT token passed somehow during or after the authentication process
  - A TLS certificate
  - Different authentication sequence
- Talon may provide an interface for the IDP 801 to become another factor in the SSO authentication process-meaning that as part of an attempt of a user to log in to a site, a corporate Single sign-on event will redirect the user to a Talon service, which will sync with the browser and verify that the user is indeed connecting from a secured browser or application.

While the user is trying to log in to a service using the corporate SSO, the TISE 701 will send a request to a Talon server 805 or directly to a component that is deployed next to the IDP 801 and notify the component that a user which answers to a specific criteria (the request can contain-user, IP, location, device type, providing a specific token, certificate, etc) is attempting to currently connect to the relevant resource, and is doing so using the TISE 701. The request may be done in a secure manner in which only the TISE 701 may succeed in providing proof to the server 805 that they are connecting as the TISE 701. The IDP 801 will verify that both the corporate SSO mechanism was successful, and that the Talon server has confirmed that the user attempting to connect has done so using the TISE 701. If the IDP 801 will not receive that request, it will not allow the user to login and/or use the corporate resources 803 attempted to be used.

Additional optimizations may be added, such as avoiding a re-authentication process or sending additional information to strengthen the authentication process.

Corporate MDM integration: Many IDP vendors have existing integrations with MDM solutions. One of the reasons for this type of integration is for the IDP to know if the device is managed by the organization.

Adjusting an MDM solution to register our environment on the device instead of the entire device will reduce the friction with the user because the user won't need to allow the organization to manage user devices but instead allows the IDP 801 to identify if the devices connected from the TISE 701.

The MDM will also be used to block access to services in case of a risk being identified, within the TISE 701.

Talon may register itself as the IDP 801 using SSO protocols such as SAML/OAuth or others. By doing so, Talon will be responsible for authentication and authorization requests. In this method, the SaaS or on-prem services will redirect the authentication request to a Talon server-side service, which will integrate with the TISE 701 by requesting the TISE 701 to send metadata in the client authentication request which will enable the login flow to distinguish between users using the TISE 701 versus users who are not using it.

For services which do not support the IDP 801 to log in, or don't support the specific IDP 801 which the organization is using, Talon may provide a functionality similar to a password manager, which may auto-complete password forms when logging in, in such a way that the TSWB 807 will be able to fill in the passwords automatically. Alternatively, remotely authenticating with the service using the Talon's backend, and delivering the authentication keys to the end point 709. For example—by frequently rotating passwords of services for users from a server, while providing a fresh password on each login. Talon may support a multi-factor authentication process, and implement it instead of the user, locally or via the backend.

Such authentications may be conducted from the TISE 701 side locally on the endpoints, or via the server side, delivering relevant credentials to the endpoints.

Many of the above authentication methods could be implemented inside the TSWB 807.

Talon may also allow users to authenticate even if a corporate IDP is not present, using different mechanisms, such as providing an IDP interface, auto-filling passwords, and other mechanisms.

Browsing restrictions and limitations

Talon may enforce different browsing restrictions and limitations, and may trigger actions according to the section "Optional action types as a result of a trigger" if the browsing restrictions apply.

Some examples of browsing restrictions are:
Browsing personal websites using a corporate browser (see section "Monitor personal websites" for more information)
Browsing corporate websites using a personal browser.
Browsing to websites which are not known to be safe
Browsing to websites with an increased risk level assessment, gathered from potential data sources such as:
The Talon's servers 805
Third-party services
The TSWB 807 preemptive website & URL scanning
Other examples from section "Browser risk scoring"
Browsing from insecure locations such as an insecure network
Browsing without being authenticated to the organization.
Browsing without authenticating using MFA/HSM/TPM
Browsing from a device which is not considered safe, according to examples from section "assessment of device security posture"
Browsing in websites which may hint on anomalous behavior compared to normal websites.
Browsing in any way which is not according to the defined corporate policy
Browsing following anomalous browsing activities sequence Talon may disallow certain actions according to parameters (solely or combined) such as corporate policy, the risk level of the website, and the type of website being browsed, user profile, installed applications, security posture. For example:
- Uploading/downloading files
- Copying/pasting information
- Printing
- Taking screenshots
- Executing external JavaScript code or opening the web browser inspector
- Installing extensions
- Connection via external services such as OAuth
- And more.

Heuristic and machine-learning based models may also factor the factors above and decide whether or not to restrict any specific browsing activity.

Figure 9:
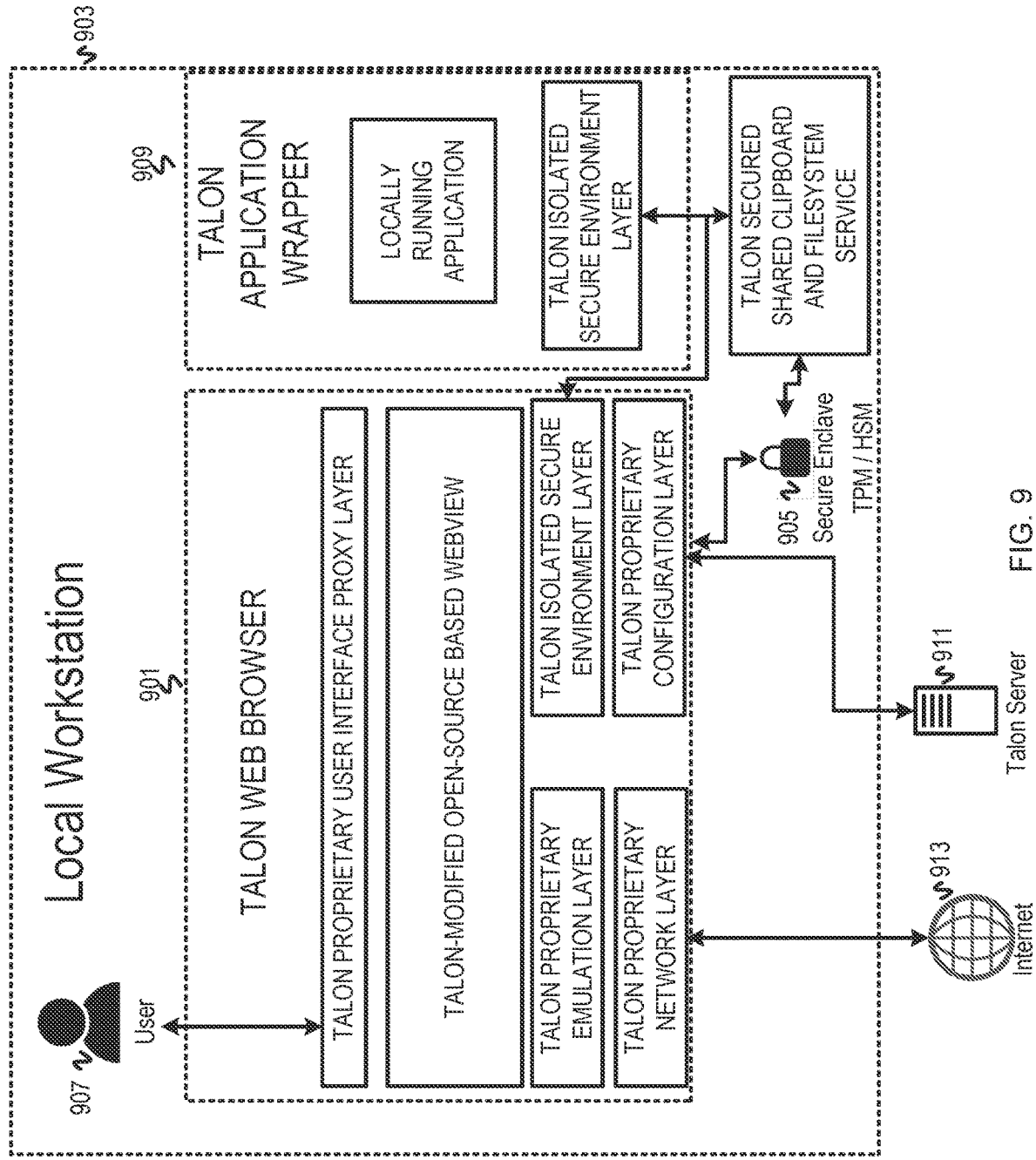
FIG. 9 depicts a diagram of a Secure Web Browser deployed to a local workstation.

FIG. 9 depicts a diagram of Secure Web Browser deployed to a local workstation.

Deployment

Talon Secured Web Browser (TSWB)

A "Talon Secured Web Browser" 901 (abbreviated TSWB) or sometimes referred to as the "Talon Web Browser" is a term that defines the set of Talon technologies that are involved in providing and/or securing the web browsing experience for users using Talon.

The TSWB 901 can also interface with components running on the device which have been separately installed, or installed at the same time using mechanisms (such as an MDM).

The TSWB 901 can be deployed using different configurations, and may be deployed as using the following mechanisms:

Talon Secured Web Browser Application 901

The TSWB 901 can be deployed as a stand-alone, pre-compiled application, running on the user's device, and deployed using any mechanism (such as an MDM, App Store, downloaded executable, etc). One method could be based on open-source browsers, with many added security and productivity enhancements. The TSWB 901 can also communicate with services installed on a local device 903, which are installed either separately or together with the application.

Talon secure web browser 901 application design overview

Talon Secured Web Browser Component

The TSWB 901 can be deployed on top of an existing web browser application, such as Google Chrome, Microsoft Edge, Apple Safari, Mozilla Firefox, Opera, Brave, and any other web browser application. The deployment is done by a combination of:
- Interfacing with the input and output of the applications using operating system hooks
- A dedicated extension which is built on top of the browser's API and/or SDK
- A stand-alone driver
- Patching the original binary. Modifying the memory of the running application
- Changing, modifying or adding files which can be loaded into the application's process memory.
- Any other mechanism of modifying the behavior of the web browser Talon Secured Web Browser Extension The TSWB 901 can be deployed as an extension which is built on top of the browser's API and/or SDK. The deployment can be done by distributing the extension using platform specific extension stores such as Google's Chrome Web Store or Microsoft Edge Add Ons portal, using organization distribution methods, using TISE 701 distribution or via local installation.

Talon may have a setup phase that downloads the necessary configuration(s) from the internet to set up the browser and Talon's other local capabilities based on the organization's settings.

Workstation-Talon Secured Web Browser and low-level layer

Talon may integrate by providing a downloadable installer which installs the TSWB 901 and the required software to create the TISE 701 and run any application within the environment. Talon may also download the required software to allow companies to centrally provision secure applications into the secure environment after installation.

Talon may be installed either by allowing users to download the installer manually from a dedicated website or distribution store, or by automatically deploying via an MDM or other deployment system.

Talon may provide a mechanism to customize the downloaded installer to be pre- configured with the corporate and/or user-specific settings, as well as certificates, credentials or encryption keys needed to operate or shorten integration and/or operation time.

Talon may support Windows, Mac and Linux, and any other relevant OS.

Workstation-separated user

Talon may provide isolation of processes by using operating system user isolation and permission functionality by executing processes as a different user. This allows isolation between interactions of the local environment 903 with the TISE 701. The operating system has built-in mechanisms to enforce that processes which have no permission to interact with each other will not be able to transmit information or share files, and Talon can make use of these mechanisms by executing Talon as a different user, while controlling the permissions and capabilities of these users from a more privileged environment.

Workstation-Containers

Talon may provide integration with local containerization technologies, as well as installing custom containerization technologies to enable isolation between processes using a more lightweight mechanism compared to a virtual machine. Talon may integrate with mechanisms such as Docker, Windows Containers, and potentially others, to run either existing or new applications within containers.

Workstation-Application wrapping

Talon may provide a special wrapping mechanism 909 which executes an application within an isolated container, controlling both its input and output by using various methods such as event hooking (e.g. Windows Event Hooking), operating system call hooking, in-code function hooking, filter drivers, user-mode file systems, DLL/shared object replacement or other means of integration with the application.

The wrapping mechanism 909 intercepts some or all input and output to the application to guarantee controlled isolation between the two environments and may provide mechanisms to intercept events which will then trigger events according to section "Optional action types as a result of a trigger"

Talon may also provide additional layers of isolation by using user-based process isolation, or containerization technologies like process isolation and Hyper-V isolation.

Smartphones and tablets

Talon may be installed from app stores such as the Google Play Store, the Apple App Store, an MDM solution, or any other solutions which allow deploying applications to smartphones and tablets. Talon may have a setup phase which downloads the necessary configuration from the internet to allow setting up the browser and Talon's other local resources and applications.

Network

Secure connectivity

Talon allows configuring secure connectivity to the corporate network 711 by supporting Layer 3, Layer 4 and Layer 7 secure connectivity, as well as other means of connectivity. The secure connectivity forces some connections going in and out of the TSWB and the secured applications within the TISE 701 will go through the corporate network 711. This allows Talon to use the existing network applications to secure the extended corporate environments.

Talon may ensure that connectivity is done securely by interfacing with the application's low-level socket API instead of relying on the application logic, as common browsers may do. By interfacing securely with the socket API, Talon can protect that malware may not manipulate browser configuration to avoid going through the Secure connectivity.

Talon may force all or some of the TISE 701 applications to also use the Secure connectivity configured.

Tunneling Support

Talon may allow tunneling connections through servers which support tunneling via VPN protocols, or other tunneling protocols over TCP and HTTP, such as WireGuard, IPSec, TLS over HTTP, SSH and SOCKS protocols.

Talon may provide built-in VPN or TCP/HTTP level tunneling support to bridge between the network of applications running within the TISE 701 and the corporate network 711, in such a way that Talon provides the necessary network-level configuration once the log-in process into the organization is complete.

Such tunneling may be conducted for specific applications or services, and not necessarily for all application and services.

Talon may also provide higher level tunneling support by interfacing with the socket API to ensure that connections are tunneled through a corporate gateway, in the following manner as an example (the example uses the SOCKS and SSH tunnel protocols):

1. The TSWB 901, or an application within the TISE 701 runs a DNS lookup. Talon may require that the network layer APIs of the applications are proxied through a secure connectivity layer 904.
2. The secure connectivity layer 904 wraps the DNS lookup call and passes the DNS request to the SOCKS server, through the SSH tunnel.
3. The TSWB 901 will then initiate a TCP connection to the appropriate IP address returned by the DNS request.
4. The secure connectivity layer 904 wraps the socket connect function and passes the connection through the SSH tunnel to the relevant remote server, via the SOCKS server.

VPN Support

Talon can provide VPN support and connect the TISE 701 to existing corporate VPN servers, in such a way that all or some internet connectivity will be tunneled through the corporate VPN servers. This can be achieved by embedding a VPN client into the TISE 701, whether as an application, or inside the TSWB 901.

Route network traffic through a Secure Gateway

Talon may provide a mechanism to integrate efficiently with web traffic scanners.

Since scanners require traffic introspection through secure channels, it may be required to install a certificate in order for network-based security equipment to be able to introspect the traffic. Talon may automatically install/deliver a certificate or provide other means to allow the Secure Gateway to inspect the traffic.

Inspection of decrypted network traffic

As the TSWB 901 can access network traffic, either unencrypted or encrypted after its decryption, Talon may provide a web traffic security analysis functionality by inspecting the network data and metadata as described in Browser risk scoring. This action can be done locally in the TSWB 901 or in Talon's server 911.

This distributed prevention and analysis functionality can be achieved without the need to reroute the traffic through a Gateway, without the need to deploy certificate or certificate authority on a browser or a device and without the need to decrypt the communication in another component.

Zero trust support

Talon may provide Zero trust support by automatically reflecting the currently authenticated corporate account to the appropriate network connectivity layer and zero-trust provider, depending on how Talon is configured. Talon may require the user to authenticate using his corporate identity to enable the TISE 701 to block traffic of unauthenticated users going in and out of the TISE 701.

Home router configuration

Talon may configure the home router either manually or automatically to provide secure network access to the corporate resources 707. This can be done using protocols such as uPnP, IGMP, router-specific APIs, updating router configuration, patching routers, and such mechanisms.

Talon may also disallow using the TISE 701 to take action if the router being used, or the WiFi network being used is not secure enough.

Talon may also require the user or automatically configure WiFi settings according to corporate policy requirements to increase security. For example, Talon may automatically change the WiFi router settings to use stronger encryption or a different type of encryption such as certificate-based WiFi connections or change weak/default passwords.

Talon may install certificates on the home router for configuring secure VPN access.

Managing activity in the Talon Isolated Secure Environment 701

Optional action types as a result of a trigger

In many different scenarios, triggers may be fired when a meaningful event occurs. The trigger is fired in-line or in parallel while a specific action is executed, due to a user action, an admin action, a server-initiated action (whether belongs to Talon, the corporate or third-party), or other reasons.

The trigger can then lead to many different configurable, context-based action types (potentially more than one). For example:

- The event being performed can be allowed.
- The event being performed can be blocked (for example, blocking the user from taking a screenshot).
- The event being performed can alert the user with a custom textual message, for example that this action may be triggering a potential risk to the company.
- A user needing to provide more data regarding the user action before continuing with the action. This may be free text or preconfigured options. The data may be used to enable a machine or a person to take a decision either at the time or after the action has taken place. The data may be logged as part of logging the event.
- The event being performed can be manipulated in a way which de-risks the event-for example, deanonymizing a submission of an email address.
- A logging event can be sent to a central logging server, such as a SIEM.
- An approval request could be sent to a manager or IT in Talon or in the company.
- An alert can be raised to an alerting system, so that an on-call agent or IT administrator can investigate the event in real-time to decide what to do with the event (e.g. does an incident need to be raised).
- The event being performed may require the user to re-authenticate using a password, a biometric method, a hardware device, a 2FA application or any other mechanism which can guarantee that the user is present and in full control of his actions.
- The event may trigger preventive countermeasures to increase security and immediately mitigate attacks, such as:
  - Block access to one or more of the corporate resources 707
  - Instruct the TISE 701 to erase all or part of its applications or data
  - Instruct the TISE 701 to disable itself and/or other components running locally, either inside or outside of the secured environment
  - Instruct the TISE 701 to reinstall itself
  - Disconnecting the machine from the corporate network 711, removing the credentials
  - Halt the TISE 701 activity for a predefined amount of time
- Environment access control
- Environment login and lock mechanisms Talon may use an authentication mechanism, which may require the user to authentication in order to use the TISE 701.

Talon may allow integration with the corporate identity provider by handling the authentication flow using the company's Single sign-on (SSO) mechanism and then validating the validity of the authentication using protocols such as SAML, OAuth2 and potentially others used for IDP integration.

Talon may allow the user to login to the TISE 701 using the corporate IDP 801 and may also enforce it to be able to log in to corporate resources 707. Talon may allow reusing the TISE 701 login to all of the corporate resources 707 using SAML, OAuth2 and potentially other protocols. The TSWB 901 may identify a login flow with an SSO protocol and bypass the requirement to go through the authentication flow if the token which is locally cached is valid.

Talon may manage the user passwords, for services which does not support the SSO, or even if the service does support SSO, for security or convenience reasons.

Talon also features lock mechanisms which can lock access to the TISE 701 and/or invalidate the token to require re-authentication to take place. Triggers for locking the TISE 701 may include:

- Idle timeout-identify that the user 907 did not use the device or the TISE 701 environment for a certain amount of time.
- Device lock-identify that the user 907 locked the device 903.
- Attempting to access a highly-secured corporate resource.
- Identifying risky or malicious behavior on the local device 903, such as a new application being installed from the internet 913.
- Changing the network connectivity, e.g. connecting to a VPN, switching wireless networks, etc.
- Once a re-authentication trigger is launched, Talon will require the user 907 to re-authenticate with different mechanisms such as:
  - The corporate Single sign-on flow.
  - A short PIN code configured by the user
  - Biometric sensor authentication
  - Hardware security module authentication.
  - Require a new password
  - 2-factor authentication Talon may reuse the SSO token for applications running within the TISE 701 as well.

Monitor anomalous user activity

Talon may provide mechanisms to monitor anomalous user activity and attempt to understand if the user currently using the device is the same user 907 who usually uses the device, or if the user who is currently using the device is the user 907 that claims to use the device. Talon may also monitor for malicious intention usage by the user 907.

The TISE 701 may implement the aforementioned using different mechanisms, such as:

- Mouse activity patterns
- Keyboard typing patterns
- Websites visited
- Applications being used
- Time worked
- Location
- Data usage.
- Services accessed, locally and remotely
- Remote resources accessed
- Running processes and services.
- Connected HW to the device
- Additional users running on the device
- Local Isolation
- Share info between protected services In order to share information between one or more locally running services in a secure manner, a sandboxed environment can be created to allow services to communicate with each other in a secure manner. For example, if the user 907 wants to edit a document residing on a service such as a corporate server or a company-managed SaaS, it may need to use an external application from the browser such as a PDF signer.

For example, if the user 907 wants to edit a document residing on a service such as a corporate server or a company-managed SaaS, it may need to use an external application from the browser such as a PDF signer.

One such example of a workflow would be as follows:
1) The user 907 can download the PDF document using the TSWB 901 from a corporate server such as Microsoft SharePoint.
2) The user 907 can then sign it using an application such as Adobe Acrobat, and save a signed copy of it locally.
3) The user 907 can then upload it back to the corporate server.

The TISE 701 may include a sandboxed environment in which local services can be executed in a closed, secure environment and communicate with each other over a shared file system, shared memory, a local socket or pipe, or any other method for intra-process communication, which is isolated from the hosting environment.

For example, this can be achieved by creating a temporary folder which is encrypted using a permanent, temporary and/or random encryption key in the isolated environment. The key is shared securely between the protected services upon user authentication. This allows only the protected services to read and write files written into the shared secure file system 705.

To create a sandboxed environment, the TISE 701 may make use of a secure enclave/security module 905, such as a hardware device or TPM/HSM which generate, store and use cryptographic keys in such a way that a malicious application cannot extract the keys and decrypt information being passed between services or stored locally. Devices such as a Hardware Security Module, a Trusted Platform Module, or a Secure Enclave can be used to create a sandboxed environment.

Example of one such method of creating a sandboxed environment and transferring secure content between applications:
1) Talon initializes the cryptographic hardware component to create a new symmetric encryption key, which is only accessible upon user validation, such as fingerprint read, pin code authentication, using an external security module, etc.
2) Talon will share the necessary information required to access the security module 905 to all applications running within the TISE 701 in a secure manner. This can be done by initializing the filesystem driver with the relevant information, for example.
3) Upon a need to transfer information between applications, such as the need to save a file locally, Talon will then use the security module 905 to encrypt information within the memory of the TISE 701. This action may trigger an action, following the section "Optional action types as a result of a trigger".
4) An application which attempts to access the file, which is present within the sandboxed TISE 701 environment, will go through a special application or file system hook/filter/driver before being allowed to access the file. This hook will verify that the application is allowed to access the file, and attempt to decrypt the file using the hardware component. This will lead to an action according to the section "Optional action types as a result of a trigger". Additional verification measures such as context, application logged in user or the application process or thread ID, accessing the file may also be used as part of the authentication process.

Any of these sharing options will be handled according to the section "Optional action types as a result of a trigger".

Exporting data from the environment

Talon may allow exporting data from the TISE 701 to applications in the non-secure environment using methods such as saving files, printing web pages or documents, and using the clipboard.

Depending on the policy defined, saving files can restricted into a secure, encrypted location which is accessible to the isolated environment but not outside, shared between the protected services. Printing and exporting web pages may be disabled by default as well. A Secure Clipboard 704 is isolated from the local computer and does not allow exporting data copied from a secure environment into the local, unsecured environment.

Applications running outside the TISE 701 may fail to read the encrypted files in order to protect the secured environment.

When an attempt to export information from the secured environment is triggered, an action may be triggered according to section "Optional action types as a result of a trigger". The action may be triggered based on whitelisting, blacklisting or heuristic mechanism depending on the context: user, application, the used websites/service/resource, time, location and any other relevant parameter.

Importing data into the environment

Just as exporting is restricted, importing data into the environment may be restricted as well. The main reasons for this limitation will be security (keeping a corporate environment clean), and privacy.

Uploading files into a web page or pasting information from the local clipboard into the isolated environment may trigger an action according to section "Optional action types as a result of a trigger", based on the relevant configuration.

Applications running within the TISE 701 may also be blocked (resulting in a fail) from reading non-TISE-marked files, in order to protect the secured environment 701. This can be achieved by Talon controlling the application's low-level file read operations, or using the OS interfaces.

Monitor screen capture

Talon may identify screen capture events of the local operating system and allows setting a policy to act upon the screen capture. This may refer to tools such as Windows Snipping tool or native operating system screen capture capabilities.

This can be achieved with actions such as logging all screen captures, deleting the graphics buffer (to avoid capturing screenshots of information appearing on the TISE 701), and other actions as in "Optional action types as a result of a trigger" section.

This allows reduction of both accidental and intentional data leakage from the organization, as well as malware access.

Monitor keyboard capture

Running in an environment in which a malware may be running a keyboard logger, keyboard capture and or keyboard sniffer may risk the organization, and may cause data leak, and or credential theft.

Talon may implement different mechanisms to identify which applications, drivers or malware running on the local device 903, are receiving information from the keyboard. Information from the keyboard can be collected by using different mechanisms, such as:

- Analyzing installed operating system hooks for keyboard and/or operating system application events sent to the application
- Analyzing API hooks
- Analyzing loaded drivers
- Any other method which may find existing running hooks
  If the application which is identified monitors keyboard events is not allowed to do so, an action is fired as per section "Optional action types as a result of a trigger".
- Monitor copy to clipboard (Secure Clipboard)

Talon creates an isolated clipboard within the TISE 701 called the Secure Clipboard 704. The Secure Clipboard 704 is separate from the local clipboard. The isolated clipboard 704 is usable within the TISE 701 and may trigger an event from the section "Optional action types as a result of a trigger" when attempted to be used.

Copying and information into the local clipboard and pasting into the TISE 701 or copying into the Secure Clipboard 704 and pasting into non-TISE applications may be acted based upon "Optional action types as a result of a trigger", and in most cases be alerted or blocked.

The Secure Clipboard 704 may be configured using various methods to make it more secure. For example:

- The Secure Clipboard 704 may be automatically purged after a specific amount of time, based on user log out or idle time from the TISE 701 or based on request from Talon's backend.
- The Secure Clipboard 704 may be monitored for content and modified according to a predefined corporate policy, for different purposes such as privacy, security, data leakage prevention, and more.
- The Secure Clipboard 704 may be scanned for viruses and malware influences.

Monitor copy of files

Talon may log or block files copied between the TISE 701 environment and the non- TISE environment and may trigger an event from the section "Optional action types as a result of a trigger" when attempted.

Talon may use different methods to make content inaccessible to the non-secure environment. Here are some examples:

- By encrypting the locally downloaded or generated files using a key which is only accessible to applications which are part of the TISE 701. If a document downloaded using an application in the TISE 701, for example, the TSWB 703, is opened by a local non-TISE application, such as Microsoft Word, it will succeed in opening the file but will fail to read and understand the contents of the file, since it is encrypted with a key not available to Word.
- By making the files hidden in a documented or undocumented methods on the file system.
- By making the files protected in such a way that the non-secure environment won't have access to the files.
- By exposing a file system filter/driver, or a user-mode file system, which disables access to the file if it was opened from a non-TISE 701 application.

Monitor risky websites

Talon may monitor websites' risk levels using various methods such as external sources, heuristics, machine learning, and predefined configuration. A granular policy control may be defined depending on the risk level of the website currently being viewed.

Based on that, actions could be taken according to section "Optional action types as a result of a trigger".

The global risk level of the TSWB 901 may be defined by the riskiest website currently being viewed using the browser.

The risk level of the environment may be re-evaluated whenever a part or all of a url is changed. If a website loads third-party content, the risk level may be affected by the websites the content is loaded from as well.

When the risk level changes, it may affect permissions in the TISE 701. For example, log or block information sharing between services, or access to the corporate network 711 via the VPN/Zero Trust.

Monitor personal websites

Talon may monitor access to personal services via the TISE 701, and take actions according to the section "Optional action types as a result of a trigger" when being accessed or when certain events within the personal websites occur, such as uploading a file.

Additional actions may be taken to automatically open the personal service in the non-TISE environment, and/or change the application that is currently in focus on the device.

Example for some of the reasons behind this could be:
1. Avoid information leakage from the secured environment outside
2. Reduce unnecessary activity in the secured environment, reducing the chances of malicious penetration into the environment
3. Reduce network or analysis load
4. Reduce privacy risks, reducing private activity in the potentially monitored environment Personal services may include, but not limited to: Webmail (Gmail, etc), Messaging, File storage (Dropbox, Mega, etc.), Banking, Porn, Gambling, Sports, News, Social Networks.

The list of such personal services may be generated by one or more of the following:
1. Generated by Talon
2. Pre-configured by the customer
3. Supplied by third-party services
4. Generated using machine learning capabilities The list of websites which are considered personal may be configured by policy, and a policy can also decide on which types of services and/or application are considered personal.

Usability

User privacy assurance

Talon may support isolation and reduction of exposure, access or collection of employee's private information, compared with company-related activity information collection. This may be achieved by whitelisting specific websites and applications allowed to be used within the TISE 701, as well as by monitoring submission of private information (e-mail addresses, phone numbers, etc.) into the TISE 701.

If potential exposure to private information is identified, it can be acted upon by logging, disabling, deanonymizing, and according to the section "Optional action types as a result of a trigger".

User work and activity monitoring

Talon may provide metric collection on user activity in the TISE 701 to a central location, as well as aggregated user activity analysis. On the TSWB 901, Talon may provide information such as how long a tab was open, length of user activity in a service, what actions has the user 907 taken within the service (interaction with a website, downloaded files, clipboard usage, screenshots taken, cache and cookies update, etc.).

Talon may provide similar metrics on applications running within the TISE 701, by hooking into operating system signals and monitoring the user 907 events sent in and out of secure applications. This may include files usage, services usage and editing, memory, registry reading and editing, etc.

Talon may also provide network metrics such as how much information was transferred between each application running within the TISE 701 and the corporate environment or the internet 913, and what type of information was transferred (HTML, images, application data files, etc).

Talon may also collect information on the device connectivity while using the TISE 701 such as what connectivity was used to access the corporate environment (wireless, wired, cellular, etc), what type of wireless router was used, what is the SSID of the wireless router, what is the make and model of the wireless router (derived by the MAC address or any other means). and similar information.

Single sign-on (SSO)

In case the organization is using an IDP, Talon may require the user to authenticate using the corporate IDP 801 before it is possible to use any application within the TISE 701, to ensure that all access to corporate resources 707 is authenticated and approved. Talon may provide a built-in authentication mechanism which enables and enforces the user to authenticate. It may also integrate common SSO protocols such as OAuth2, SAML, and more, for better usability such as seamless login between corporate on-premise resources and SaaS applications, as well as better security, potentially as the authentication may be done outside of a web container. This can potentially avoid attacks which rely on the authentication happening within a web container such as XSS attacks, malicious Chrome Extensions, and more.

Talon may be configured to require authentication on some or all the corporate resources 707, depending on different parameters such as corporate policy, website or application risk level, user risk level, and more.

For SaaS services, which supports or does not support the corporate SSO, Talon may implement a password manager, and connect with the desired service, locally, or via the backend. This will reduce the risk of password leakage, and gain better control on user corporate activities.

Enterprise ad blocker

Talon may provide a method to block web-based ads and trackers from the TSWB 901, and may have increased capabilities compared to an ad blocker which is installed as a browser extension due to running inside the browser (in the configuration of TSWB 901 as a browser or injection).

This feature increases the privacy of users using the TSWB 901, increases the security level by blocking potentially malicious content from being loaded (such as targeted ads with malware), and decreases the chance of company data and information leakage through HTTP requests requesting advertisements, trackers and any other external resources.

The blocking feature may also accelerate the speed of browsing the internet, reduce costs and infrastructure load, and creates a better user experience.

Remote support and configuration

Talon may provide preconfigured multi-step support walkthroughs to assist the users with how to perform specific actions.

TSWB capabilities may enable guided walkthroughs to work outside of the context of the web browser's current view since the walkthrough engine runs in the context of the browser. The pre-configured multi-step walkthroughs may be pre-configured in a central remote server, or in other tools which support configuring walkthroughs. Talon may also provide a set of pre-defined walkthroughs which are commonly used throughout different companies, without needing to build the walkthroughs in advance.

An example of a potential walkthrough which can be configured is a walkthrough which will assist the user with configuring settings in a SaaS service accessed with Talon.

Talon may also provide full remote control of the TSWB 901 as well as applications running within the TISE 701 for IT support.

User configuration, preferences and passwords storage

Talon may provide an ability to store user configuration and preferences in a secure remote enterprise server. This allows users to move between browsers installed in different environments and receive similar experience and flow across many browsers.

Examples for different preferences may include bookmarks, color mode, themes. home page, current browsing session, and more.

Talon may also provide storing secure credentials and fields such as passwords and payment methods, using a secure and encrypted storage vault. Talon may support its own solution to store the user credentials, as well as integrate with the corporate's credential manager to receive passwords, such as integrating with a Privilege Access Management solutions. Talon may use on-premises services, local endpoint solution, network storage services, or a dedicated remote server provided by Talon.

Predefined bookmarks on browser

Talon may allow providing additional editable or read-only bookmarks, managed centrally. The bookmarks will automatically appear under the user's existing bookmarks once configured centrally.

Bookmarks may also be defined at a group level or a personal level, depending on the logged-in user.

Talon may provide some sort of interface to configure the bookmarks, as well as the ability to import bookmarks from external sources.

Prefilled enterprise info on browser and applications

Similar to bookmarks, Talon may be able to pre-fill information for users depending on which groups the logged-in user is part of. Here are examples of information that may be pre-filled:

Auto-filled passwords, user and company information, addresses & payment methods.
Theme
Home page URL
Default search engine.
New page settings
Accessibility features
Proxy settings
Language & spell checking.
Privacy & security settings, such as whether or not third party cookies are allowed
Whitelisted domains
Any other type of browser configurable user setting
Pre-Installed or remotely installed extensions on browser Talon may provide a method to install extensions on the browser including public extensions, Talon developed extensions, and extensions internally developed by the customer within the company.

Talon may also be able to deliver such extensions following the browser installation.

Talon may also provide a method to pre-configure the extensions by different methods. For example, Talon may be able to modify the configuration after installation, at any other given moment, or execute a script on the proper context which is able to modify the extension's configuration.

Share browsing tabs between devices

Talon may be able to share tabs between logged-in devices by synchronizing all open tabs at any given moment with a centralized server, residing either on-premises or in the cloud. This allows any device running the TSWB 901 to be able to access open tabs on different devices, on which the user is currently logged in to.

Share clipboard between devices

Talon may provide a configuration-based method of sharing information such as text, photos, files, and other data by using a secure clipboard 704 which is synchronized with a central corporate server, residing either on-premises or in the cloud. Once a copy, cut or paste operation is triggered on the TISE 701 (either on the TSWB 901 or an application running within it), the operation is securely synchronized with the remote server, according to the logged-in user, using an encrypted secure connection.

For example, if a user has a desktop and a laptop, he may copy text from a Microsoft Word application running on his desktop, and paste it into the TSWB 901 on his laptop.

Any action related to the secure clipboard 704 such as cut, copy and paste may trigger an action, following the section "Optional action types as a result of a trigger".

Re-open content on personal browser

When the TSWB 901 is used for personal employee usage (for example, personal service is accessed), the TSWB 901 may re-open personal websites and/or applications outside of the TISE 701, to comply with corporate policy while ensuring convenient usability to the user 907. In addition, the TSWB 901 may trigger an action from section "Optional action types as a result of a trigger".

The TSWB 901 may also notify the user 907 that the operation that the user 907 tried to take was modified to avoid going through the corporate browser, the corporate network 711, and/or the TISE 701.

Copy URLs between TISE and non-TISE browsers

URLs often include personal identifiers as well as built-in credentials, especially in poorly designed systems. The TSWB 901 may provide a mechanism to identify URLs being copied and enforce a specific policy for the user action of copying or pasting a URL. The TSWB 901 may trigger an action from section "Optional action types as a result of a trigger" as well.

The TSWB 901 may provide additional mechanisms to identify malicious information within URLs, personal information, built-in credentials, and more, using different methods. Depending on the contents of the URL, Talon may trigger a different action.

Pre install applications on environment

Talon may also automatically deploy, install and configure applications onto employee devices, into the TISE 701. Upon any dedicated trigger, such as first use of a new device, a periodic check, or a request coming from the central server, Talon will provision the current device and install necessary software, depending on a predefined configuration which matches the logged in user and device policy. For example, a specific group may be assigned a specific software to be installed on their devices.

Talon may also re-configure or update existing software which is installed in the TISE 701.

Talon may provision the devices either with or without requiring user interaction.

Security mechanisms to protect the Talon Isolated Secure Environment 701

Data and Files

Data protection

Talon may locally store information in a secure manner. Locally stored information may include:

Temporary files

Configuration files

Browser metadata

Cookies

User preferences

Downloaded files.

Cached resources

The TISE 701 may encrypt part or all of the following pieces of information before storing it on the device. Talon may also configure the files in such a way that only the TISE 701 may have access to those files, and use mechanisms such as exclusive access to files to avoid malware from being able to access the information.

Talon may also provide additional measures to automatically (triggered upon an event such as a periodic trigger, a device start-up, user log-in or log-out, and more) or manually purge locally stored information, depending on corporate policy.

Talon may also temporarily lock or permanently purge (delete) information upon an event triggered either manually or automatically (for example, marking a device as stolen or anomalous behavior), and the event may be triggered either locally or from remote. Locking may be done by methods such as making encryption keys unavailable or actively encrypting information to guarantee that a malicious attacker won't be able to read the information stored on disk or in-memory.

Talon may use basic deletion methods, or advanced deletion methods such as disk wiping by repetitively writing onto the disk where the old information used to reside.

Scan downloaded files

Talon may provide a method for scanning downloaded files before they are opened using the TISE 701. This may be done with either defining a local policy in which the local anti-virus scans the file and confirms that the file is indeed clean, or using a remote mechanism which downloads the file to a specific location (either locally or on a dedicated server), sends it to a server which scans the file, receives an approval that the file is indeed clean, and only then makes the file accessible to the application or the user.

Convert downloaded files

Talon may provide a mechanism, either as part of the software, as an external service, or on a server provided by Talon set up either on-premises or remotely, to process downloaded files in such a method which validates that no embedded exploits remain in the file, by parsing and/or converting the downloaded file from its original format to a processed format.

Examples:
A PDF may be converted into a new PDF which includes images of the rendered content.
A Microsoft Word Document may be converted into a text file, which loses potentially complex features embedded in the file, which may be of risk.
Macros from Microsoft Office Documents can be removed as part of the processing.

Place bait information to detect malicious activity

Talon may place unique information such as configurations, cookies, and cached information of specific domains within the context of the TSWB 901, as long as they are unused, for the purpose of creating a "honey-pot" and to identify malware running locally. Alternatively, Talon may monitor outgoing communication from other applications and try and identify behavior which does not match the user's expected behavior.

Since Talon should not be used to access private environments, it allows the TISE 701 to use a broader set of domains such as personal web-based email solutions or file storage solutions to place unique information which is likely to be accessed by malware. Upon placing the unique information, Talon specifically monitors the placed information so that if the information is accessed, it will trigger a potential incident. If the information which is placed within the browser is accessed and violates the standard use of the browser or the corporate policy, a trigger may be executed, and an action may take place according to section "Optional action types as a result of a trigger"

Figure 10:
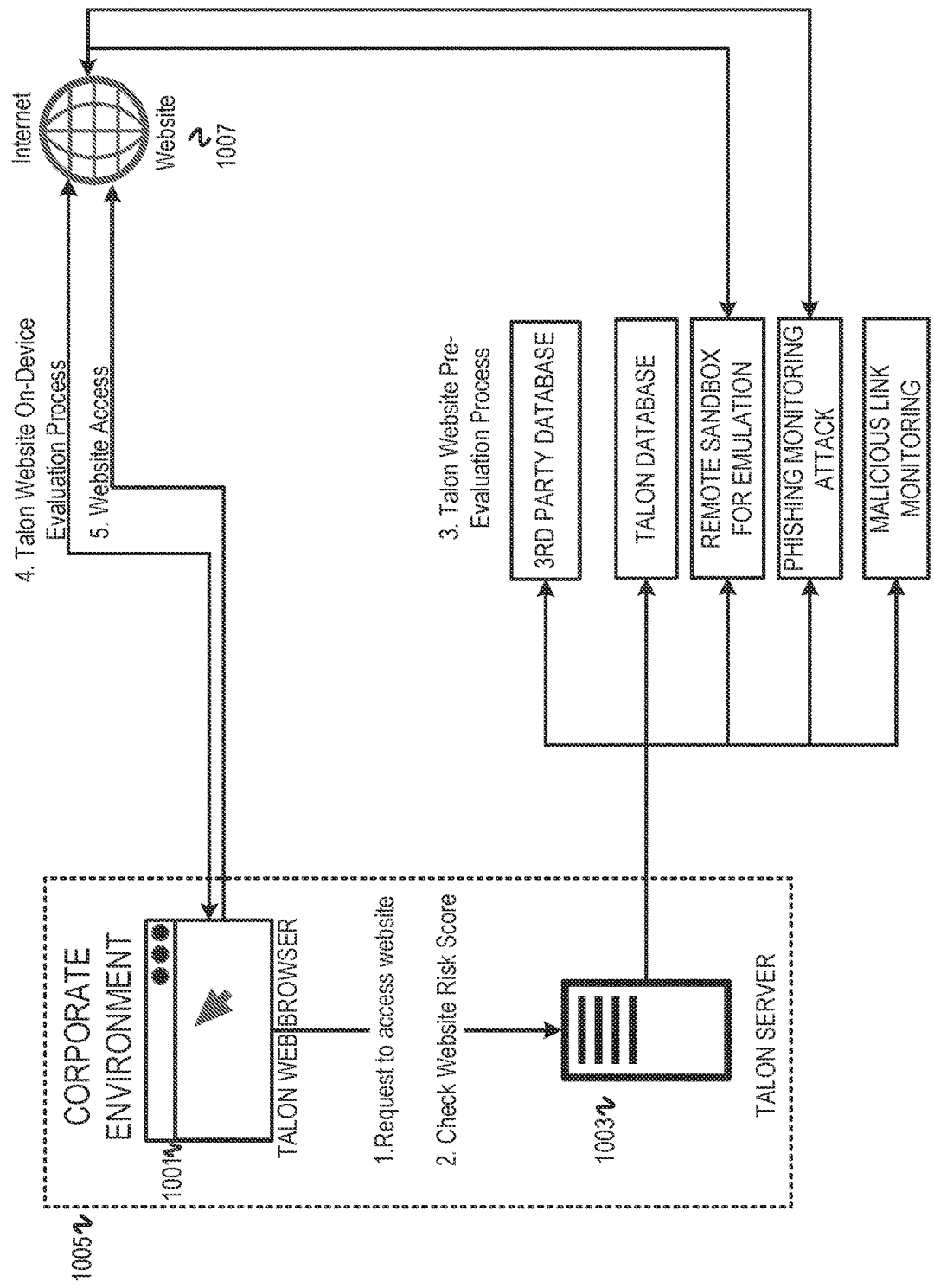
FIG. 10 depicts a diagram of security mechanisms.

FIG. 10 depicts a diagram of security mechanisms.

Browser security

Talon provides a set of security mechanisms to protect a TSWB 1001, using the following flow, as an example:

Anti-tampering mechanism

Malware can compromise the browser security by modifying the browser's security settings, by patching the browser, replacing some of its code or by installing malicious extensions.

A TSWB 1001 may implement an anti-tampering mechanism using different methods, including:

- A Talon server-side 1003 may periodically send code or a request to the TSWB 1001, which will be used to calculate the hash on some of the components that the TSWB relies upon-its code, dependent libraries, other components of the operating system such as decoders and third-party applications installed.
- Talon may require the operating system to confirm that the TSWB 1001 binary is digitally signed (or components of the TISE 701), using different methods such as RPC (e.g. WMI), utilizing MDM built-in or external solutions, etc.
- Talon may use either software encryption mechanisms or the TPM/HSM to sign and/or verify different parts of code on the storage, or running locally in the memory, to prove that its code was not tampered with.

The TSWB 1001 can either verify that it has not been tampered with locally or send an output to the server 1003 to verify that the TSWB 1001 wasn't compromised.

In case the browser's 1001 anti-tampering mechanism's triggered potential tampering, it may execute one or more actions from section "Optional action types as a result of a trigger".

Cache, cookies and other browser metadata security

To prevent a malicious actor from accessing any sensitive data (For example, configuration files, cache, browser cookies, certain binaries etc.), the data will be saved in a secure manner.

The data is protected by one or more of the following methods:

- Encrypt the data locally, using a key which is only accessible after secure authentication and not cached locally (or saved within a TPM/HSM).
- Store the settings in a remote server which is only accessible after secure authentication, and download it locally upon request with or without saving to disk.
- Obfuscate the locally stored settings
- Use a remote filesystem which is only accessible secure after authentication Website behavior profiling to detect threats The TSWB 1001 may collect information on how websites behave, to spot anomalies throughout the organization.

Examples of information which may be logged and analyzed:

- Amount of data transferred and resources downloaded while loading pages.
- Amount of time or processing which is executed within the context of the browser.
- Which APIs are used, such as HTML5 and DOM APIs.
- Which permissions are being used as part of browsing the page Using anomaly detection, the TSWB 1001 may compare browsing activity in respect to other users using the TSWB 1001 or the same user using the TSWB 1001 at different times, and attempt to raise an incident if an anomaly has been found.

Upon such an action, all information required to investigate the incident may be logged, as well as other actions according to section "Optional action types as a result of a trigger".

Tracking Browser activity to find potential attacks

The TSWB 1001 may provide means to track browser activity and behavior to identify potential attacks, either between browsing activity for the same user or browsing activity between different users of a company.

For example, to track for XSS attacks, the TSWB 1001 may create a "site profile" which is built by downloading and storing the code and/or behavior patterns being executed on that website (e.g. which APIs, devices, cookies, or other stored information are being accessed by the code running on the browser). Each new visit to the site may trigger a comparison event in which the existing site profile is being compared to the new site's code. If a change is identified which may indicate an XSS attack, different automated tests can be executed to verify that an attack is taking place.

The stored information can then be analyzed and/or sent for further analysis, so that the other TSWB 1001 in the corporate environment 1005 or between organizations can benefit from the information gathered.

A potential browser attack may also trigger an action as specified in "Optional action types as a result of a trigger".

Monitor phishing attacks

The TSWB 1001 may analyze a new page before presenting it to the user and may attempt to emulate user behavior to check for phishing attacks or malicious malware being executed on a page. The TSWB 1001 may also track link clicks and forms filled, for post-event analysis.

The TSWB 1001 may analyze the page URL, page content, understand what kind of information the user needs to submit (for example a username and a password) and check its similarity to other pages with similar content in order to see if the website being visited is a phishing site which is disguised to the original site, in order to collect user information.

The TSWB 1001 may use different methods of identifying the phishing website such as:

- A database of known phishing attack websites (a blacklist)
- A database of trusted websites (a whitelist)
- An AI-based model which knows how to identify such websites.
- Scraping the website to match the domain of the website being accessed with content in the page.
- Scraping the website to find links within the website which direct out of the website but shouldn't, or other logical mismatches between code that exists in the website with the originating server, such as pages which should refer to the local domain and show a different domain than the actual domain.

Scraping the website and in parallel find and scrape another website to try and find the original website, by matching page style or content Site security information, including certificates Analysis can be done locally or in a remote server.

Monitor Malicious link

The TSWB 1001 may monitor for malicious links, pop-ups and websites using methods such as heuristics or known malicious website databases. Clicking on a potentially malicious link may also trigger an action as specified in "Optional action types as a result of a trigger".

Monitor malicious extensions

The TSWB 1001 may analyze the contents of an installed extension as well as an extension pending install and monitor the behavior of extensions over time using heuristics, predefined rules, known list of potentially harmful extensions, or other mechanisms. For example, if the TSWB 1001 identifies that a code originating from a Chrome extension tries to interact with a corporate website, it may monitor and analyze its behavior for potential security, privacy or data leakage prevention issues.

The TSWB 1001 may hold a list of pre-approved and not-allowed extensions.

The TSWB 1001 may disallow or block the installation of extensions which ask for broad permissions, for example extensions which are allowed to inject code into websites.

The TSWB 1001 may also allow the installation of specific extensions but block certain capabilities of extensions which may be considered risky.

If the TSWB 1001 identifies a potentially malicious behavior of an extension, it may execute an action as specified in "Optional action types as a result of a trigger".

Remove risky functionality from browser

The TSWB 1001 may be based on open-source technology for some components of the web browsing and rendering functionality. Some of the features which the code provides can be potentially harmful due to an increased surface of attack or increased capabilities, which are not required for standard corporate use. Features such as user tracking, sending feedback, game- related features, ads improving tech, etc.

The TSWB 1001 may remove the features either by disabling them using a predefined policy configured centrally, or by completely removing parts of the code.

Browser hardening and monitoring for web application attacks

The TSWB 1001 may feature mechanisms that increase the security of browsers and make it more difficult to attack them.

Some examples include:

Hardened default policies, for example referrer-policy, cross origin resource policy, and more.

Auto-fill passwords & payment info upon stronger authentication

Pop-up blocking unless specifically allowed

Disabling downloads unless specifically allowed. Manipulation of running code on the browser to make it safer, for example the removal of specific APIs which put the user at risk Emulate pages before rendering According to policy and a risk assessment of the page currently being viewed, the TSWB 1001 may render and evaluate some pages using an isolation mechanism such as a local sandboxed emulator, remote service (via an API), a local or remote container, a local or remote virtual machine, or any other isolated rendering mechanism, either before or while presenting it to the user, in order to identify and take action on different risks, for example drive by download attacks, browser exploits, and other attacks.

The TSWB 1001 may also inject user events to identify malicious potential behavior in the isolated environment 701.

Browser risk scoring

The TSWB 1001 may calculate a risk score based on one or more parameters. Such parameters may include, but are not limited to:

URL

Page content

Page metadata

TLS presence

Page content history.

Page JavaScript code

Certificate being used

User behavior.

Domains related to the page

Websites that link to the page being viewed.

Server IP address and derived information from the IP address

Risk scores of other websites associated with the server being accessed, by different methods such as being hosted on the same server, having the same TLS certificate, or having similar content as other websites If a risk score changes and goes above a certain threshold, the TSWB 1001 may trigger an action according to section "Optional action types as a result of a trigger".

General Mechanisms

Isolate risky activities

Talon may decide to isolate certain pages or applications according to different risk factors, such as heuristics, predefined rules, external services, and more. Upon a decision to isolate the website or the application, it will load the risky website or the application using different methods of isolation. Some examples of different methods include:

Running a website page in an isolated web view with limited access to cookies, extensions, etc.

Running a website page in a new, isolated container, in a different process space, and with limited access to cookies, extensions, etc.

Running the rendering part of a website on an external service, and transferring the image content of the render to the browser.

Running a website page in a virtual machine which resides either on the local device or a remote server Applications may also be executed safely using different isolation methods, for example:

Executing an application on a virtual machine and making the required resources available to the virtual machine locally and securely Executing an application using a lightweight containerization mechanism such as "Windows Sandbox"

Executing applications regularly while manipulating and/or hooking into the operating system calls, to enable the control of any interaction between the application and the operating system Using software or hardware debugging features to enable greater control of running applications The TISE 701 may also provide mechanisms which can seamlessly move a running website session or a running application between an isolated context and a non-isolated running context. For example, the TSWB 1001 may decide to copy the cookies from the isolated web view to the main the TSWB 1001 web view when the risk level decreases back to normal levels.

Memory manipulation and access protection

Talon may provide methods of battling against malware which can penetrate the process space of the TSWB 1001, or to running applications.

Some methods include:
Anti-memory dump mechanisms which disable malware from reading and dumping the process space for later processing. Some methods include real-time encryption and decryption of memory, using the processor hardware to lock and unlock pages, and more.
Increased randomization of addresses and location of code sections, obfuscation and other methods to avoid bypassing Address Space Layout Randomization.
Micro patching Talon may provide an ability to receive and apply updates from a remote server, which may be owned by either the company or a third-party. Talon may have different methods of updating the binaries of the TSWB 1001 or an application in the TISE 701 to patch potential vulnerabilities. For example:
For large updates which must involve restarting a web browser, Talon may provide a method of forcefully restarting the TSWB 1001, while communicating with the user to ensure that his work will not be negatively affected.
For smaller updates. Talon may provide a method of patching the application while running, both on the disk and in-memory.

The TSWB 1001 may also provide a mechanism to permanently patch the code of websites according to their URL, for different purposes such as security, privacy, data leakage prevention, or performance issues.

Virtual patching

The TSWB 1001 and running applications in the TISE 701 may provide a mechanism which allows the ability to enable and disable code flows and external inputs for virtual patching by configuration. The patches are deployed from a remote server, which may be owned by either the company or a third-party and may be introduced either automatically or manually.

Website patching

The TSWB 1001 may provide a mechanism to patch/ change the website running code in the browser-before rendering the page, if a site is found to have an existing vulnerability either inside its code or in a third party code loaded onto the website and is not patched yet.

This can be done by applying patches according to a pattern based on the URL such as a regular expression, before loading the website.

Network Encryption

Talon can enforce that network activity is encrypted between the device 709 and the internet 1007, or the device 709 and the corporate network 711.

Encryption to the internet 1007 can be enforced using many mechanisms, such as:
Disallowing HTTP traffic
Disallowing non-encrypted DNS requests
Disallowing non-tunneled or non-encrypted socket connections from the TSWB 1001 or the TISE 701

Enforcing network encryption from the TISE 701 allows companies using Talon to comply with certain regulations which requires full network encryption.

SaaS Security
Shadow SaaS

Talon may monitor the usage of SaaS applications, in order to keep track of SaaS services which are used in the organization.

Parameters that may be tracked include applications are that logged in using the company's credentials or personal credentials, how the services are being used, and that resources are involved.

Talon may also monitor for third-party SaaS services, by monitoring OAuth requests and connections.

This may allow the corporate information technology and security teams have to better visibility on the usage and risks.

The information may be collected to a central location and may later be managed using a dedicated interface, or fused into other existing corporate interfaces, which allows managing of SaaS services used within the company or using company resources.

SSO for services that don't support SAML/IDP

Talon may provide a Single sign-on solution for companies which do not have an IDP, or to companies which have an LDAP server only, or to complement such solutions where they have gaps.

For companies with an LDAP server, Talon can interface with an LDAP server and create a Single sign-on experience for websites, using different methods, for example sending the authentication credential to the LDAP server to verify access. Talon may expose OAuth2 and SAML protocols for the purpose of enabling SSO.

For other use cases, Talon may store services credentials, locally or on a centralized cloud location, and provide a Single sign-on experience similar to a company which uses an IDP and allow the user to log in to different services using the same mechanism.

This may be achieved by logging into the service locally, or by logging into the service from the centralized location and delivering the authentication token to the end points. By using the centralized cloud location, the passwords are not stored on the endpoint, increasing the security level and reducing risk.

Talon may also support different multi-factor authentication technics, for increased security. For example, by analyzing the multi-factor code email on the TSWB, and submitting the code.

SaaS EDR

Talon may be able to execute requests on behalf of the logged in user if an API is not available and may be configured to administer different SaaS services using API keys. Therefore, Talon can interact with the SaaS user and organization configuration and provide an anti-malware, anti-threat solution to protect SaaS services by analyzing the configuration of the SaaS services, and scanning for potential unwanted, malicious configurations, and persistence of exploits.

For example, Talon may be able to identify malware which silently adds e-mail forwarding rules or aliases to Gmail (which causes data leakage), even though there is no API for configuring forwarding rules in Gmail not through the user interface.

System wide logging, notifications and remediation of activities in TISE 701

Identify threats across users or devices

Talon may monitor and log events and general user behavior between different users and devices by collecting information to a central location for better analyzed and more accurate decision making. By centralizing information related to the browsing behavior of users, application usage in the TISE 701, Talon may find correlations and anomalies across logged events which may indicate on potential threats, attacks or malicious behavior.

Talon may dynamically enable or disable the data collection of endpoints to balance between performance and security according to risk levels, as well as set sensitivity thresholds for anomaly detection of threats. Talon may use different mechanisms to decide on risk levels using heuristics, predefined rules, external sources, manual intervention or other mechanisms.

Actions as results of correlation of threats

Upon an identified threat, Talon may execute one or more counteractive measures to reduce the risk level or eliminate the current threat:

Talon may increase the risk level for all the TISE 701 and the TSWB 1001 and applications, which in turn causes the devices to harden and reduces the risk of a malicious actor to successfully execute attacks against the organization Talon may decide to run predefined actions, such as disabling internet connectivity or VPN connections to corporate devices.

Talon may decide to alert an external system or specific users, at Talon or in the corporation about the anomaly, and may provide specific information about the threat.

Talon may decide to send a company-wide message to all corporate employees, warning them about the threat.

Talon may trigger remote mechanisms which increase security on the TISE 701, such as:

Password reset

Re-authentication requirement, with one factor or multiple factors

Forceful logout from the end point 709 or from the TISE 701

Remote locking of the endpoint 709

Re-installation of the TISE 701, or part of its applications or the TSWB 1001

Resetting the TISE 701 configuration, or part of its applications or the TSWB 1001 configuration In addition, Talon may execute one or more actions from section "Optional action types as a result of a trigger"

Or any other counteractive measure

Talon Isolated Secure Environment access based on security posture

Anti-tampering mechanism supported by cloud security manager

Talon may interact with a cloud security manager to ensure that the device which Talon runs on is not compromised using different methods, including remote attestation, attestation done by the TSWB 1001 to the device, and more.

Talon may require validation that the device is not compromised before allowing the user to access the TISE 701 applications.

For example, the TISE 701 may check which processes are running and verify that the running processes are safe. If Talon identifies processes that may render the environment as risky, it may trigger an action from section "Optional action types as a result of a trigger", e.g. disallow logging into corporate services using the TISE 701.

Integration with local third-party security managers to validate integrity Talon may integrate with one or more different third-party solutions to validate the integrity of the environment. Talon may integrate with solutions such as:

Cloud security managers

Anti-virus and Endpoint Detection and Response applications running on the end points Mobile Device Management and Mobile Application Management solutions OS native security solutions and loggers In the event that a risk was found, a trigger may be triggered, and an action from section "Optional action types as a result of a trigger" may take place.

Assessment of device security posture

The TISE 701 may provide a mechanism to assess the security posture of a device. Using the device's security posture, the TISE 701 may decide to change the risk level in which the TISE 701 operates, as well as trigger actions specified in section "Optional action types as a result of a trigger". For example, the TISE 701 may decide to communicate with the user about potential issues found locally and disallow using the TSWB 1001 or the TISE 701 applications until the user fixes the issues which caused the device to fail the security posture assessment.

The TISE 701 may also prompt the user and require him to actively fix the necessary issues, so that the security posture assessment will pass successfully. The TISE 701 may guide the user how to fix the issues. The TISE 701 may also provide the user a mechanism to fix the security posture assessment automatically, and trigger it either manually or automatically. Once the security posture assessment passes, the TISE 701 may decide to change back the risk level to a different state, to allow the user to work with the TSWB 1001 and/or the TISE 701 applications normally.

A risk level change based on the assessment of the device security posture may disable the user from being able to work using the TISE 701.

The security posture assessment may include one or more checks. Here are examples of some assessments that the TISE 701 may run:

Is there an anti-virus/EDR installed on the device?

Is the anti-virus/EDR solution configured properly? (e.g. is real-time scanning operational, last update is recent)?

Is a public WI-FI network being used?

Is the network being used open, without a proper security?

Does the network being used have a high enough security level?

Is there a password configured for logging into the device?

Is the device being used rooted or was the kernel or any operating system component tampered?

Does the device have malicious or unknown applications installed?

Does the device currently run malicious or unknown applications?

Does the user have administrator permissions or wide permissions on the local device?

Is a firewall installed and enabled?

Is the operating system configured with any dangerous defaults which can cause the device to be easily compromised?

Is the operating system patched to the latest version?

Are all applications being used patched to the latest version?

Is there a nearby multi-factor authentication mechanism next to the device?

Did the user use biometric-based or hardware-based authentication to log into the device?

Is the device currently connected to a VPN?

Is the router being used to provide internet connectivity updated to a recent version?

Is the TISE 701 running the latest version?

Is the TSWB 1001 running the latest version?

Wifi security assessment

Talon may assess how safe the connectivity of the current internet connection is by assessing the level of security of the current connection as specified in "Assessment of device security posture". In addition, Talon may use passive or active methods to understand and identify other potentially suspicious and threatening devices which are connected to the same network as the current device. Talon may also check for known and unpatched vulnerabilities in the connected WI-FI's router.

Enhanced security for the Talon Isolated Secure Environment peripherals

Home/office router update and configuration

To increase security and reduce the risk of devices running in home and/or office network which may be compromised, Talon may proactively check if the router which provides internet connectivity to the current device has an updated recent firmware installed and it is configured properly and securely.

If not, Talon may ask the user to update it, proactively update it upon approval, and/or trigger an action from section "Optional action types as a result of a trigger".

For example, Talon may check if uPnP or DMZ is configured in the current router. These features increase the risk of a corporate device to be hacked, and therefore Talon may disallow using the TISE 701 before the features are turned off on the router.

Monitor OAuth

Talon may log and/or interfere with OAuth login sequences to protect certain applications and services from authenticating with other untrusted services.

Such decisions may be based on an approval-list, blocking-list of services, or by depending on the requested permissions scope of the 3rd party OAuth request.

This may be done by analyzing the required access rights for the service during connection request or following it. For example, access to—email, emails content, calendar, configuration changes, etc.

Talon will analyze the services requesting the access and the requested access to determine its intention and may take an action based on section "Optional action types as a result of a trigger".

Security training

Talon may provide security training and walkthroughs which provide on-demand training to new and existing users. Since the TISE 701 has high visibility into the user's actions, Talon can identify the best timing for when to enable a specific walkthrough, training, or test.

Talon may also decide to score users based on how they behave and report it back to a central location.

Talon may decide to automatically re-engage with specific walkthroughs if Talon's assessment showed that the user did not achieve the training goals in some areas of the training.

The security training can also be re-initiated from a central location by a person, which can evaluate who needs to re-do the training according to results, or time which have passed.

The security training may include, but is not limited to, one or more subjects from the following topics:

Phishing scams
Email scams
Social engineering.
Malware
Password security
Documents security
Safe browsing habits
Social networking dangers
Clean desk policy
Compliance Dirty or Risky isolated environment inside a secure environment Main value proposition Talon may be used to enable employees using corporate devices to use the corporate equipment to conduct risky activities in a way that reduces the risk of malware activity that will impact the device or corporate data.

Talon's isolation capabilities may allow that even if the browser's environment and/or the applications running inside an isolated sandbox will be compromised, no/low harm will be done to the device, the local network or the company, as a result of the breach.

This may be done by disallowing access to the corporate resources 707 when using Talon's risky isolated environment, except for allowing the user to access the web which may be isolated from the corporate network 711.

Talon may enable this by allowing only the minimum required information such as keyboard, mouse, screen and/or sound devices may have access to the risky environment, and may enforce a set of restrictions in the operating system level or (other levels) which may provide that many or all types of successful hacking attacks will only compromise the risky environment, and not the secure corporate environment 1005.

This may include a disconnect between network, disk, OS events such as the clipboard, and more.

Un-monitoring

Talon may support an operational mode in which no event is being logged as part of using a personal environment and/or risky environment.

This may allow the company to have reduced legal exposure to privacy or data collection issues concerning employees using their corporate equipment for personal needs.

Connecting not through VPN

Talon may provide internet access for the TSWB 1001 and the risky environment in a method which does not go through the corporate network 711, to allow isolating of the activity on the risky environment from the company's activities and/or reduced traffic and costs.

For example, if the TISE 701 is being used from a home environment on a managed corporate device, then Talon may enable applications running in the TISE 701 to connect through the corporate VPN while enabling the risky TSWB 1001 to be used for risky activities, and allowing it to access the internet directly from the home gateway and not through a company-provided VPN.

If the TISE 701 is being used from work and using a managed corporate device, then the TISE 701 may be able to tunnel all risky traffic out to the internet without risking the corporate network 711 or nearby devices.

Prevent installations

To allow greater security of corporate devices, Talon may provide a method to enforce corporate devices not to allow installation of software or browser extensions downloaded from the risky environment.

Risky browsing

Talon may provide a hardened environment for browsing in environments which are considered more risky than others. This mechanism may limit the ability for information to pass between the local environment and the risky environment. The TSWB 1001 may trigger moving between risky browsing and standard browsing using different triggers.

Some examples of limitations include:
Disallowing access to the device keyboard
Disallowing screenshots
Disallowing file downloads
Disallowing access to cookies and session variables.
Disallowing access to HTML based local storage mechanisms.
Disallowing access to hardware devices from HTML, such as the 3D graphics card, camera, hardware security module, and more.
Disallowing JavaScript based URL fetching from external resources
Disallowing access to specific domains

The invention claimed is:

1. A system comprising:
a user equipment (UE) having thereon ambient software secure isolated environment comprising a secure web browser (SWB), wherein the secure isolated environment the SWB from the ambient software in the UE;
the SWB configured to obtain a security token to access one or more digital resources of an enterprise and configured to monitor and control ingress and egress data with respect to the secure isolated environment, wherein the SWB configured to control the ingress and egress data comprises the SWB configured to enforce one or more security constraints of an enterprise associated with the UE on the ingress and egress data,
wherein the secure isolated environment is configured to run a set of one or more software integrity tests of the SWB according to a testing policy of the enterprise, and wherein the SWB being configured to obtain a security token comprises the SWB being configured to obtain the security token if a sufficient integrity value is determined from the one or more software integrity tests.

2. The system according to claim 1 wherein the secure isolated environment wraps at least one software application to conform with the one or more security constraints which are defined by a security policy of the enterprise.

3. The system according to claim 2 wherein the secure isolated environment comprises at least one secure service application useable by the SWB and the at least one wrapped application.

4. The system according to claim 2 wherein communications between wrapped applications in the secure isolated environment is via a secure encrypted communication channel and communications between the SWB and a wrapped application are via a secure encrypted communication channel.

5. The system according to claim 1 wherein the SWB monitors communications of a user of the UE to acquire data characterizing browsing behavior of the user and websites that the user visits.

6. The system according to claim 1 further comprising a data processing hub having a secure communication channel with the SWB, wherein at least one of the hub and the SWB processes the acquired data to determine normal patterns of interaction of the user with websites that the user accesses.

7. The system according to claim 1 wherein, the secure isolated environment is configured to determine risk of at least one of the ambient software and a user and to determine whether cladding of the SWB is sufficient with respect to the determined risk, and wherein the SWB being configured to obtain the security token comprises the SWB being configured to obtain the security token if the cladding is sufficient.

8. A method comprising: isolating a web browser within a secure isolated environment on a user equipment (UE) from ambient software also on the UE;
authenticating a web browser with an extended identifier;
after authenticating the web browser, running a set of one or more software integrity tests of the web browser according to a testing policy of an enterprise;
determining whether the web browser has a sufficient integrity value from the one or more software integrity tests;
based on successful authentication of the web browser and determining that the web browser has a sufficient integrity value, issuing the web browser a security token to access one or more digital resources of the enterprise; and
after the web browser is issued the security token, the web browser monitoring and controlling ingress and egress data with respect to the secure isolated environment, wherein the web browser controlling the ingress and egress data comprises the web browser enforcing one or more security constraints of the enterprise on the ingress and egress data.

9. The method of claim 8 further comprising the secure isolated environment wrapping at least one software application to conform with the one or more security constraints which are defined by a security policy of the enterprise.

10. The method of claim 8, wherein authenticating the web browser comprises requesting a data processing hub of the enterprise to authenticate the browser.

11. The method of claim 8, wherein the extended identifier comprises a browser identifier, a user identifier, and an identifier of the UE.

12. The method of claim 8, further comprising the web browser acquiring data characterizing browsing behavior of a user and websites that the user visits, while monitoring the ingress and egress data.

13. The method of claim 12 further comprising the web browser processing the acquired data to determine normal behavior patterns or the web browser communicating the acquired data to a data processing hub of the enterprise via a secure communication channel with the web browser and the data processing hub processing the acquired data to determine normal patterns of behavior with respect to the user interaction with website.

14. The method of claim 8 further comprising:
running software environment safety tests on the ambient software;
retrieving a risk profile of a user identified with a user identifier that is part of the extended identifier;
determining risk based on a result of the software environment safety tests and based on the risk profile; and
determining whether cladding of the web browser is sufficient with respect to the determined risk,
wherein issuing the web browser the security token is also based on determining that the cladding is sufficient.

15. The method of claim 14 further comprising amending the cladding after an initial determination that the cladding is insufficient and then determining that the cladding is sufficient after amending the cladding.

16. The method of claim 8, wherein authenticating the web browser comprises requesting an identity service provider to authenticate the web browser and then, based on successful authentication of the web browser, determining whether the web browser is permitted to access digital resources of the enterprise.

17. The method of claim 8 further comprising retrieving the set of software integrity tests.

18. The method of claim 17 further comprising:
determining a weight for each of the set of software integrity tests, wherein the weights are based on at least one of a type of the UE, true positive rate of the corresponding software integrity test, true negative rate of the corresponding software integrity test, nuisance rating, past performance of the corresponding software integrity test, and a current cybersecurity context,
wherein running the set of one or more software integrity tests on the web browser comprises selecting which of the set of software integrity tests to run based on the weighting.

19. The method of claim 8, wherein running a set of one or more software integrity tests of the web browser according to a testing policy of an enterprise comprises running the set of software integrity tests based on at least one of frequency of user activity with known malicious websites and time since software integrity of the web browser was tested.

20. The method of claim 8, wherein the web browser monitoring ingress and egress data comprises the web browser acquiring at least one of data characterizing browser extensions and data indicating access behavior with respect to the digital resources.

* * * * *